US011748173B2

(12) United States Patent
Hayashi

(10) Patent No.: US 11,748,173 B2
(45) Date of Patent: Sep. 5, 2023

(54) INFORMATION PROCESSING SYSTEM, INFORMATION PROCESSING METHOD, AND STORAGE MEDIUM FOR CONTROLLING VIRTUAL SERVER THAT EXECUTES PROGRAM

(71) Applicant: Yuuichiroh Hayashi, Kanagawa (JP)

(72) Inventor: Yuuichiroh Hayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 224 days.

(21) Appl. No.: 16/930,509

(22) Filed: Jul. 16, 2020

(65) Prior Publication Data

US 2021/0019199 A1    Jan. 21, 2021

(30) Foreign Application Priority Data

Jul. 19, 2019    (JP) ................................. 2019-134103
May 14, 2020    (JP) ................................. 2020-085463

(51) Int. Cl.
*G06F 9/52* (2006.01)
*G06F 9/455* (2018.01)

(52) U.S. Cl.
CPC ............ *G06F 9/52* (2013.01); *G06F 9/45558* (2013.01); *G06F 2009/45595* (2013.01)

(58) Field of Classification Search
None
See application file for complete search history.

(56) References Cited

U.S. PATENT DOCUMENTS

| 8,006,134 | B2* | 8/2011 | Nammatsu | G06F 11/0709 714/26 |
| 8,286,165 | B2* | 10/2012 | Miyata | G06F 1/32 718/1 |
| 8,346,934 | B2* | 1/2013 | Okamoto | G06F 9/45558 709/221 |
| 8,429,669 | B2* | 4/2013 | Moriki | G06F 9/45558 718/1 |
| 8,438,567 | B2 | 5/2013 | Matsushima | |
| 8,776,050 | B2* | 7/2014 | Plouffe | G06F 9/45537 718/1 |

(Continued)

FOREIGN PATENT DOCUMENTS

| JP | 2009-134695 | 6/2009 |
| JP | 2014-022985 | 2/2014 |

(Continued)

OTHER PUBLICATIONS

Lin et al. "Object-Oriented Distributed Workflow Management System", 2005 IEEE, pp. 685-689.*

(Continued)

*Primary Examiner* — Van H Nguyen
(74) *Attorney, Agent, or Firm* — IPUSA, PLLC

(57) ABSTRACT

An information processing system executes a series of processes. The information processing system includes a computer which manages, among multiple programs for executing the series of processes, a first program included in the information processing system and one or more second programs registered in the information processing system. The computer controls execution of the series of processes including a process executed by the second program and controls a virtual server for executing the second program.

9 Claims, 21 Drawing Sheets

(56) References Cited

U.S. PATENT DOCUMENTS

| | | | |
|---|---|---|---|
| 8,825,858 B1* | 9/2014 | Atchity | H04L 47/788 |
| | | | 709/224 |
| 9,047,195 B2* | 6/2015 | Aikoh | G06F 12/0833 |
| 9,258,252 B1* | 2/2016 | Atchity | H04L 43/0817 |
| 9,360,941 B2 | 6/2016 | Hayashi et al. | |
| 9,397,953 B2* | 7/2016 | Saito | H04L 47/70 |
| 10,097,620 B2* | 10/2018 | Reddy | H04L 67/38 |
| 10,120,758 B2 | 11/2018 | Hayashi et al. | |
| 10,122,870 B2 | 11/2018 | Sugimura et al. | |
| 10,136,017 B2 | 11/2018 | Hayashi et al. | |
| 10,250,771 B2 | 4/2019 | Hayashi | |
| 10,277,546 B2 | 4/2019 | Arai | |
| 10,356,266 B2 | 7/2019 | Hayashi et al. | |
| 10,445,489 B2 | 10/2019 | Hayashi et al. | |
| 10,481,935 B2* | 11/2019 | Iwashina | G06F 9/45558 |
| 10,530,943 B2 | 1/2020 | Hayashi | |
| 10,757,286 B2* | 8/2020 | Inoue | G06F 9/5038 |
| 2003/0189591 A1* | 10/2003 | Mo | G06F 21/34 |
| | | | 715/738 |
| 2007/0233838 A1* | 10/2007 | Takamoto | H04L 67/1002 |
| | | | 709/226 |
| 2016/0117340 A1 | 4/2016 | Hayashi | |
| 2018/0157384 A1 | 6/2018 | Baneva et al. | |
| 2018/0343352 A1 | 11/2018 | Hayashi et al. | |
| 2019/0289160 A1 | 9/2019 | Hayashi et al. | |

FOREIGN PATENT DOCUMENTS

| | | |
|---|---|---|
| JP | 2015-207108 | 11/2015 |
| JP | 2016-015400 | 1/2016 |
| JP | 2016-154000 | 8/2016 |

OTHER PUBLICATIONS

Qiu et al. "An Automated Reasoning Method Used in Workflow Management System", 2003 IEEE, pp. 5016-5021.*
Junior et al. "Execution Support to Long Running Workflows", 2014 IEEE, pp. 496-503.*
Extended European Search Report for 20186324.8 dated Dec. 16, 2020.

* cited by examiner

FIG.6A

| COMPONENT ID | COMPONENT NAME | PROCESS INFORMATION | REQUEST TARGET |
|---|---|---|---|
| 0001 | OCR PROCESS | EXECUTE OCR PROCESS | local host |
| 0002 | CONVERSION PROCESS | EXECUTE CONVERSION PROCESS | local host |
| ⋮ | ⋮ | ⋮ | ⋮ |
| 1001 | PROCESS A | EXECUTE PROCESS A | LINKED SERVICE CONTROLLER |
| 1001 | PROCESS B | EXECUTE PROCESS B | LINKED SERVICE CONTROLLER |
| ⋮ | ⋮ | ⋮ | ⋮ |

FIG.6B

| COMPONENT ID | COMPONENT NAME | PROCESS INFORMATION | HOST ID |
|---|---|---|---|
| 1001 | PROCESS A | EXECUTE PROCESS A | H0001 |
| 1002 | PROCESS B | EXECUTE PROCESS B | H0001 |
| 1003 | PROCESS C | EXECUTE PROCESS C | H0002 |
| 1004 | PROCESS D | EXECUTE PROCESS D | H0002 |
| ... | ... | ... | ... |

FIG.6C

| HOST ID | HOST | VENDOR ID |
|---|---|---|
| H0001 | server1.com | vendor1 |
| H0002 | server2.com | vendor2 |
| ... | ... | ... |

FIG.6D

| SHARING ID | HOST ID | SHARING VENDOR ID |
|---|---|---|
| S0001 | H0001 | vendor3 |
| S0002 | H0002 | vendor4 |
| ... | ... | ... |

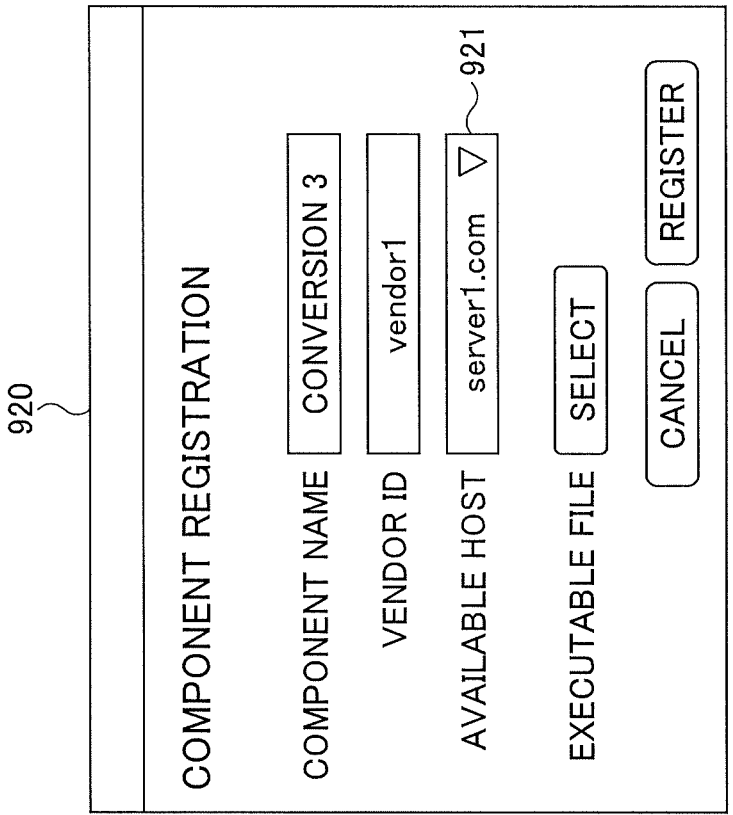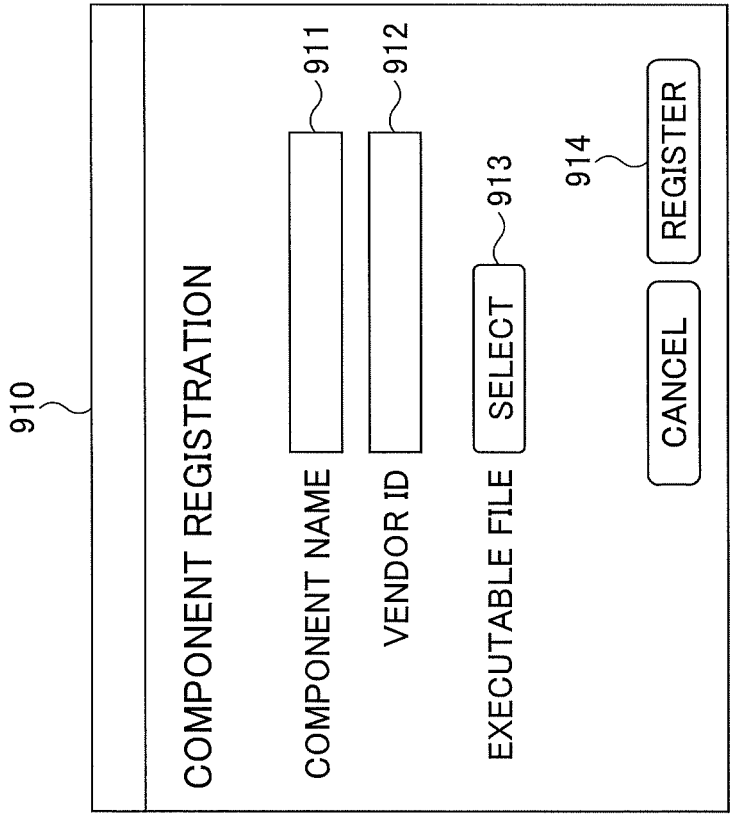

INFORMATION PROCESSING SYSTEM, INFORMATION PROCESSING METHOD, AND STORAGE MEDIUM FOR CONTROLLING VIRTUAL SERVER THAT EXECUTES PROGRAM

CROSS-REFERENCE TO RELATED APPLICATIONS

The present application claims priority under 35 U.S.C. § 119 to Japanese Patent Application No. 2019-134103, filed on Jul. 19, 2019 and Japanese Patent Application No. 2020-085463, filed on May 14, 2020. The contents of which are incorporated herein by reference in their entirety.

BACKGROUND OF THE INVENTION

1. Field of the Invention

An aspect of this disclosure relates to an information processing system, an information processing apparatus, an information processing method, and a storage medium.

2. Description of the Related Art

There is a known information processing system where a series of processes are executed according to a workflow (procedure) in which multiple processes are defined (see, for example, Japanese Unexamined Patent Application Publication No. 2016-015400).

Also, there is a known image processing apparatus where a process of a basic function and a process of an added extended function are executed as separate processes to prevent a defect in the extended function from influencing the basic function of the system (see, for example, Japanese Unexamined Patent Application Publication No. 2009-134695).

In an information processing system that executes a procedure defining a series of processes, for example, a workflow may be generated using a component provided by an external vendor to provide a service linked with the service provided by the external vendor.

However, in this case, for example, when there is a problem in the component provided by the external vendor, the quality of the entire service provided by the information processing system may be reduced due to the influence of the problem. Also, when such a problem occurs, separating processes in one apparatus as in the technology disclosed in Japanese Unexamined Patent Publication No. 2009-134695 may not be able to prevent reduction in the quality of the entire service provided by the information processing system.

SUMMARY OF THE INVENTION

According to an aspect of this disclosure, there is provided an information processing system for executing a series of processes. The information processing system includes a computer configured to manage, among multiple programs for executing the series of processes, a first program included in the information processing system and a second program registered in the information processing system, control execution of the series of processes including a process executed by the second program, and control a virtual server for executing the second program.

BRIEF DESCRIPTION OF THE DRAWINGS

FIGS. 6A through 6D are tables illustrating examples of information managed by a service providing system according to an embodiment;

FIGS. 9A and 9B are drawings illustrating examples of display screens according to the first embodiment;

DESCRIPTION OF THE EMBODIMENTS

The present invention is made in view of the above-described problems. An aspect of this disclosure makes it possible to prevent reduction in the quality of the entire service provided by an information processing system even when a problem occurs in a component (program) provided by, for example, an external vendor.

Embodiments of the present invention are described below with reference to the accompanying drawings.

<System Configuration>

Figure 1:
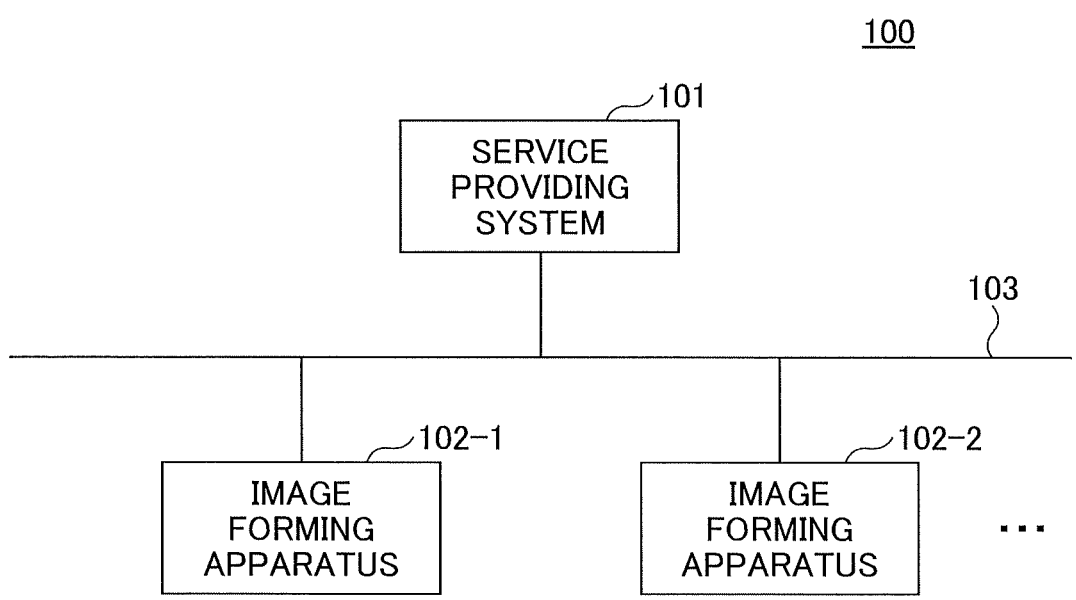
FIG. 1 is a drawing illustrating an example of a system configuration of an information processing system according to an embodiment.

FIG. 1 is a drawing illustrating an example of a system configuration of an information processing system 100 according to an embodiment. The information processing system 100 includes, for example, a service providing system 101 and one or more image forming apparatuses 102-1, 102-2, ..., which are examples of terminals used by users. The service providing system 101 and the image forming apparatuses 102 are communicably connected to each other via a network 103. In the descriptions below, "image forming apparatus 102" is used to refer to any one of the image forming apparatuses 102-1, 102-2, ....

The service providing system 101 may include one or more information processing apparatuses having a configuration of a computer. For example, the service providing system 101 may be implemented by a server connected to the network 103 or may be implemented by a so-called cloud service.

For example, the service providing system 101 provides applications (web applications), each of which executes a procedure (which is hereafter referred to as a "workflow") defining a series of processes, to terminals such as the image forming apparatuses 102 connected via the network 103 to the service providing system 101.

Here, a "workflow" indicates information defining a series of processes obtained by combining multiple components that execute predetermined processes such as an input process, a conversion process, and an output process on electronic data such as image data to be processed. A "component" indicates a program that executes a process defined in the workflow and may also be referred to as, for example, a module, an application, a plug-in, or simply a program.

The image forming apparatus 102 is, for example, a multifunction peripheral (MFP) that includes a scan function, a copy function, a printer function, and a facsimile function in one housing, and is an example of a terminal that includes a web browser and used by a user. For example, the user can use the web browser of the image forming apparatus 102 to access a web page provided by the service providing system 101 and use applications to cause the service providing system 101 to execute various workflows. As another example, the user may cause the service providing system 101 to execute various workflows by using, instead of a web browser, a client application that is for the service providing system 101 and executed by the image forming apparatus 102.

Also, the image forming apparatus 102 may include functions for executing a part (or all) of processes included in the workflow in response to a request from the service providing system 101.

In the descriptions below, as an example, it is assumed that a terminal used by the user is the image forming apparatus 102. However, a terminal used by the user is not limited to the image forming apparatus 102. For example, a terminal used by the user may also be an output apparatus such as a projector (PJ), an interactive white board (IWB, a white board with a function of an electronic blackboard capable of mutual communications), a digital signage, or a head-up display (HUD) device. Also, a terminal used by the user may be, for example, an industrial machine, an imaging device, a sound collector, a medical device, a network home appliance, a car (Connected Car), a digital camera, or a wearable terminal. Further, a terminal used by the user may be a general-purpose information terminal such as a desktop personal computer (PC), a notebook PC, a smartphone, or a tablet terminal.

With the above configuration, the service providing system 101 can define a workflow by using a component(s) provided by a vendor (which is hereafter referred to as an "external vendor") different from the service provider of the service providing system 101. This enables the service providing system 101 to easily provide applications that execute workflows linked with various services provided by an external vendor(s).

However, in this case, if a serious failure (for example, runaway or memory leak) occurs in a component provided by an external vendor, the influence of the failed component may reduce the quality of the entire service provided by the service providing system 101. Also, when such a problem occurs, simply separating processes in one apparatus as in the technology disclosed in Japanese Unexamined Patent Application Publication No. 2009-134695 may not be able to prevent reduction in the quality of the entire service provided by the information processing system.

Therefore, the service providing system 101 according to the present embodiment manages first components (first programs) installed in the service providing system 101 and second components (second programs) registered in the service providing system 101. Also, the service providing system 101 generates virtual servers for executing the second components and causes the virtual servers to execute the second components.

Examples of the first components include various components that are provided by the service provider providing the service providing system 101 and installed beforehand in the service providing system 101. Examples of the second components include various components that are provided by, for example, an external vendor, a partner company, and a dealer (which may be collectively referred to as external vendors) and registered in the service providing system 101 by, for example, administrators of the external vendor, the partner company, and the dealer.

However, the second components are not limited to components provided by the external vendors. For example, the second components may also include a component newly developed by the provider of the service providing system 101 and an evaluation component.

Preferably, the service providing system 101 manages the second components by dividing the second components into multiple groups, and causes different virtual servers assigned to the respective groups to execute processes of the corresponding second components. For example, when second components are provided by multiple external vendors, the service providing system 101 causes different virtual servers assigned to the respective external vendors to execute the corresponding second components. Even if a serious failure occurs in a component provided by a certain external vendor, this configuration makes it possible to prevent the component from adversely affecting components provided by other external vendors.

For example, with the related-art technologies, if a failure occurs in a component provided by an external vendor, the component may occupy the memory, and processes of other components may stop because they cannot acquire the memory. Also, if a failure occurs in a component provided by an external vendor, the component may occupy central processing unit (CPU) resources, and required CPU resources may not be allocated to other components.

On the other hand, because separate virtual servers are provided for different external vendors in the service providing system 101 of the present embodiment, even if such a problem occurs, it is possible to prevent the component from adversely affecting components provided by other external vendors. Also, with the configuration of the present embodiment, the influence of a failure occurred in a component provided by a certain external vendor is limited to the virtual server executing that component. Accordingly, the present embodiment can prevent not only the influence among external vendors but also the influence on the entire system.

The service providing system 101 may be configured to cause different virtual servers to execute processes of respective second components.

Here, a virtual server indicates a server that executes, for example, an operating system (OS) and an application(s) using limited resources obtained by dividing the resources of a processor and a memory of a server using a virtualization program.

A virtual server is not necessarily implemented by one physical server, and may be implemented by multiple physical servers. A virtual server may also be referred to, for example, as a "container" or a "Docker container.

A virtual server executes processes within allocated resources. Therefore, even if a serious failure occurs in the virtual server, the reduction in the quality of the entire service provided by the service providing system 101 can be prevented. Also, the service providing system 101 can selectively restart only the virtual server where a serious failure occurs and therefore can easily restore the system.

For the above reasons, even if a problem occurs in a component provided by an external vendor, the present embodiment makes it possible to prevent reduction in the quality of the entire service provided by the information processing system.

<Hardware Configurations>

Next, hardware configurations of apparatuses included in the information processing system 100 are described.

(hardware Configuration of Service Providing System)

Figure 2:
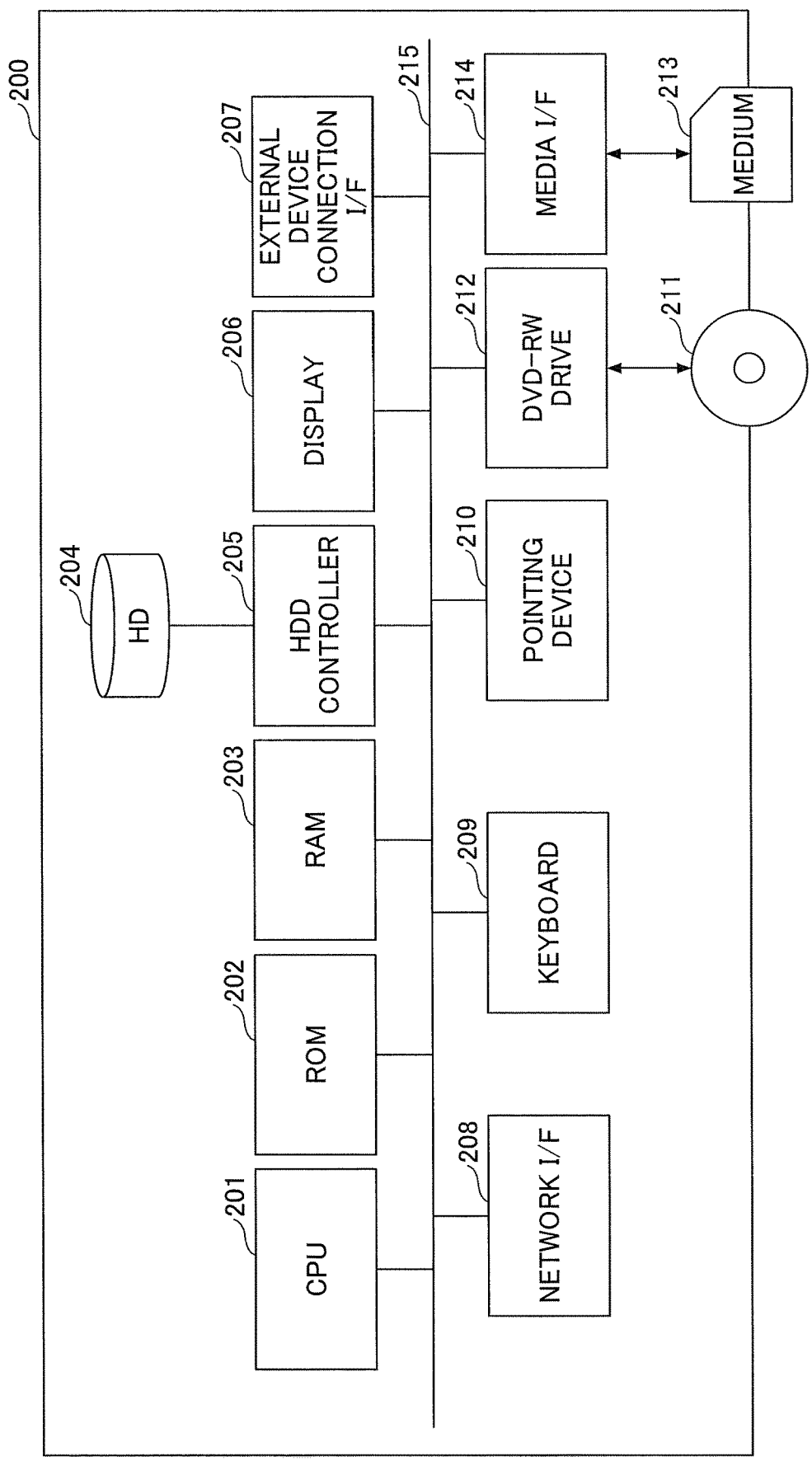
FIG. 2 is a drawing illustrating an example of a hardware configuration of a computer according to an embodiment.

The service providing system 101 is implemented by, for example, a computer 200 or multiple computers 200 as illustrated in FIG. 2.

FIG. 2 is a drawing illustrating an example of a hardware configuration of a computer according to an embodiment. As exemplified in FIG. 2, the computer 200 includes a central processing unit (CPU) 201, a read-only memory (ROM) 202, a random access memory (RAM) 203, a hard disk (HD) 204, a hard disk drive (HDD) controller 205, a display 206, an external device connection interface (I/F) 207, a network I/F 208, a keyboard 209, a pointing device 210, a digital versatile disk rewritable (DVD RW) drive 212, a media I/F 214, and a bus line 215.

The CPU 201 controls the operation of the entire computer 200. The ROM 202 stores, for example, a program such as an initial program loader (IPL) used for starting the CPU 201. The RAM 203 is used as a work area for the CPU 201. The HD 204 stores various types of data such as programs. The HDD controller 205 controls reading and writing of various types of data from and to the HD 204 under the control of the CPU 201.

The display 206 displays various information items such as a cursor, menus, windows, characters, and images. The external device connection I/F 207 is an interface for connecting various external devices. Examples of external devices include an universal serial bus (USB) memory and a printer. The network I/F 208 is an interface for data communications via the network 103.

The keyboard 209 is an example of an input unit including multiple keys for inputting characters, numerical values, and various instructions. The pointing device 210 is an example of an input unit for selecting and executing various instructions, selecting an object, and moving a cursor. The DVD-RW drive 212 controls reading and writing of various types of data from and to a DVD-RW 211, which is an example of a removable recording medium. The DVD-RW 211 may instead be a different type of recording medium such as a DVD-R. The media I/F 214 controls reading and writing (storing) of data from and to a medium 213 such as a flash memory. The bus line 215 is, for example, an address bus, a data bus, and various control signals for electrically connecting the components of the computer 200.

(hardware Configuration of Image Forming Apparatus)

Figure 3:
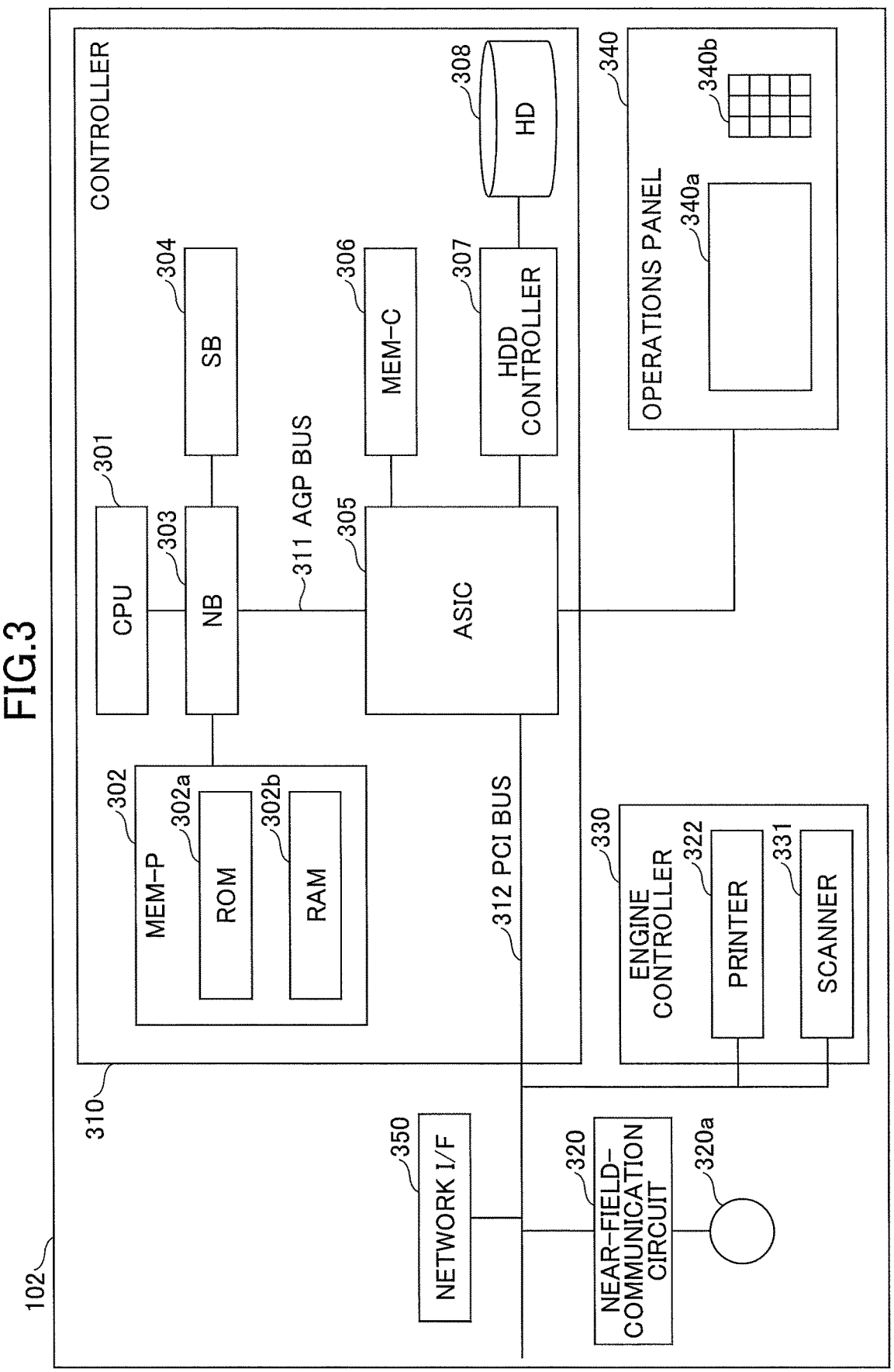
FIG. 3 is a drawing illustrating an example of a hardware configuration of an image forming apparatus according to an embodiment.

FIG. 3 is a drawing illustrating an example of a hardware configuration of an image forming apparatus according to an embodiment. Here, the hardware configuration of the image forming apparatus 102 is described as an example of a hardware configuration of a terminal used by the user.

As exemplified in FIG. 3, the image forming apparatus 102 includes a controller 310, a near-field-communication circuit 320, an engine controller 330, an operations panel 340, and a network I/F 350.

The controller 310 includes a CPU 301 that is a main component of a computer, a system memory (MEM-P) 302, a north bridge (NB) 303, a south bridge (SB) 304, an application specific integrated circuit (ASIC) 305, a local memory (MEM-C) 306 that is a storage, an HDD controller 307, and an HD 308 that is a storage. The NB 303 and the ASIC 305 are connected to each other via an accelerated graphics port (AGP) bus 311.

The CPU 301 is a controller that controls the entire image forming apparatus 102. The NB 303 is a bridge for connecting the CPU 301, the MEM-P 302, the SB 304, and the AGP bus 311 to each other and includes a memory controller for controlling reading and writing of data from and to the MEM-P 302, a peripheral component interconnect (PCI) master, and an AGP target.

The MEM-P 302 includes a ROM 302a that is a memory for storing programs and data for implementing functions of the controller 310 and a RAM 302b that is used, for example, to load programs and data and as a drawing memory for memory printing. Programs stored in the RAM 302b may be recorded and provided in a computer-readable recording medium such as a CD-ROM, a CD-R, or a DVD as installable or executable files.

The SB 304 is a bridge for connecting the NB 303 to PCI devices and peripheral devices. The ASIC 305 is an integrated circuit (IC) for image processing applications and includes hardware components for image processing. The ASIC 305 functions as a bridge that connects the AGP bus 311, the PCI bus 312, the HDD controller 307, and the MEM-C 306 to each other. The ASIC 305 includes a PCI target, an AGP master, an arbiter (ARB) that forms the core of the ASIC 305, a memory controller that controls the MEM-C 306, multiple direct memory access controllers (DMAC) that, for example, rotate image data using hardware logics, and a PCI unit that performs data transfer with a scanner 331 and a printer 332 via the PCI bus 312. A USB interface or an IEEE 1394 (Institute of Electrical and Electronics Engineers 1394) interface may also be connected to the ASIC 305.

The MEM-C 306 is a local memory used as an image buffer for copying and a code buffer. The HD 308 is a storage for storing image data, font data used for printing, and forms. The HD 308 controls reading and writing of data from and to the HD 308 under the control of the CPU 301. The AGP bus 311 is a bus interface for a graphics accelerator card proposed to speed up graphics processing. The AGP bus 311 enables direct access to the MEM-P 302 at high throughput, and can increase the speed of the graphics accelerator card.

The near-field-communication circuit 320 is a communication circuit complying to, for example, near field communication (NFC) or Bluetooth (registered trademark). The near-field-communication circuit 320 performs near field communications with other devices via, for example, an antenna 320a.

The engine controller 330 includes, for example, the scanner 331 and the printer 332. The scanner 331 is a device for scanning, for example, documents. The printer 332 is a printing device that prints print data on printing media. Each of the scanner 331 and the printer 332 includes an image processor for error diffusion and gamma conversion.

The operations panel 340 includes a panel display 340a such as a touch panel that displays, for example, current settings and a selection screen and receives inputs from an operator, and operation buttons 340b that includes a numeric keypad for receiving image forming condition settings such as a density setting and a start key for receiving a copy start instruction. The controller 310 controls the entire image forming apparatus 102, and controls, for example, drawing, communications, and inputs from the operations panel 340.

An application switching key of the operations panel 340 enables sequentially switching and selecting a document box function, a copy function, a printer function, and a facsimile function of the image forming apparatus 102. The image forming apparatus 102 transitions to a document box mode when the document box function is selected, to a copy mode when the copy function is selected, to a printer mode when the printer function is selected, and to a facsimile mode when the facsimile function is selected.

The network I/F 350 is an interface for data communications via the network 103. The near-field-communication circuit 320 and the network I/F 350 are electrically connected to the ASIC 305 via the PCI bus 312.

<Functional Configurations>

Figure 4:
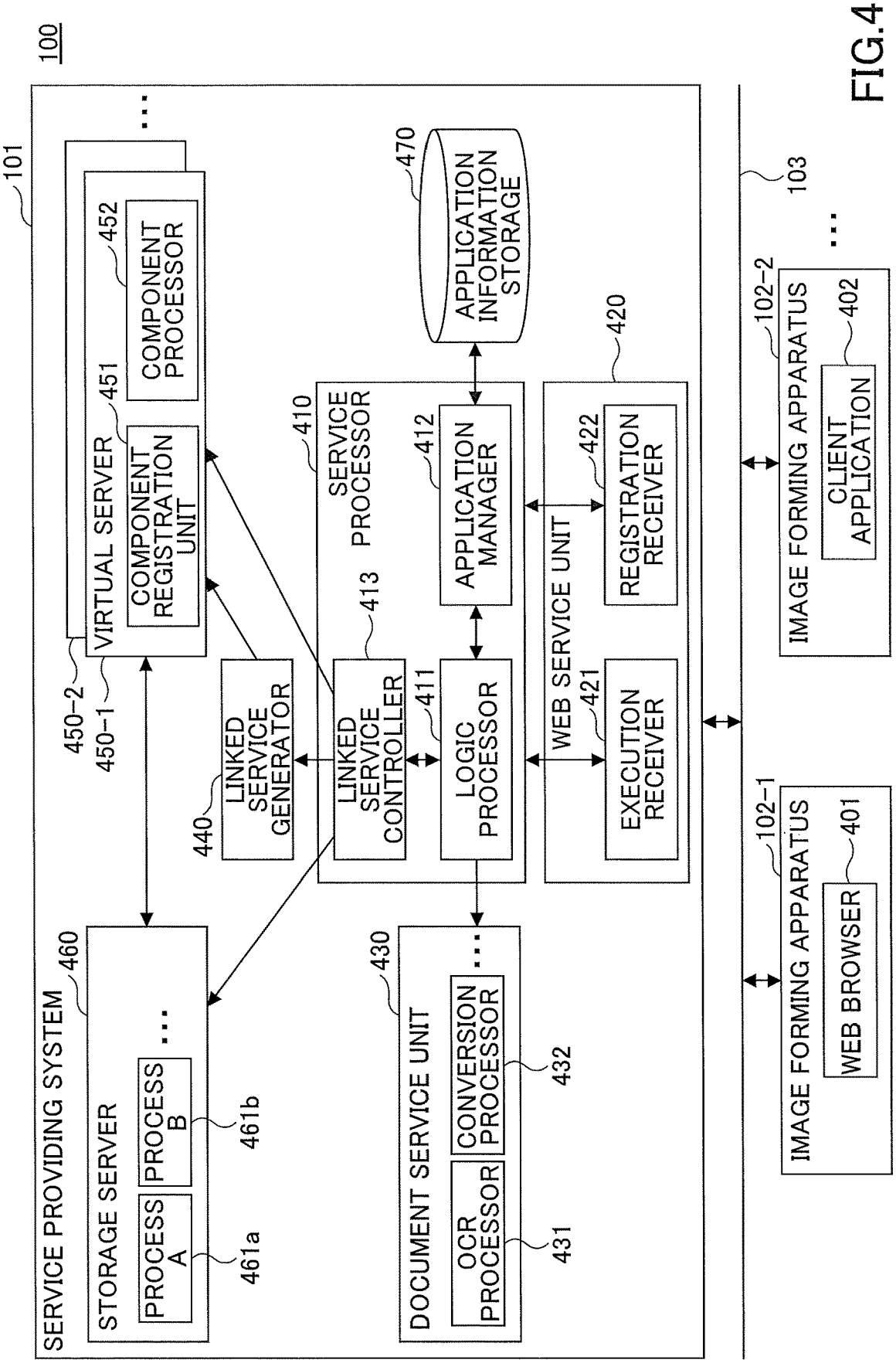
FIG. 4 is a drawing illustrating an example of a functional configuration of the information processing system according to an embodiment.

FIG. 4 is a drawing illustrating an example of a functional configuration of the information processing system 100 according to an embodiment. In the descriptions below, it is assumed that a user of the information processing system 100 uses a service (for example, a web application) provided by the service providing system 101 by using a web browser 401 included in the image forming apparatus 102-1.

However, the present invention is not limited to this example, and the user may use a service provided by the service providing system 101 by using a client application 402 for the service providing system 101 included in the image forming apparatus 102-2. As another example, the user may use a service provided by the service providing system 101 by using a web browser 401 included in an information processing apparatus such as a PC or a tablet terminal having a hardware configuration of the computer 200 as illustrated in FIG. 2. Further, the user may use a service provided by the service providing system 101 by using a client application 402 included in an information processing apparatus.

(Functional Configuration of Service Providing System)

For example, the service providing system 101 executes one or more programs with the CPU 201 or multiple computers 200 of FIG. 2 to implement a service processor 410, a web service unit 420, a document service unit 430, a linked service generator 440, and one or more virtual servers 450-1, 450-2, . . . . One or more of the functional components may be implemented by hardware. In the descriptions below, the term "virtual server 450" is used to refer to any one of the virtual servers 450-1, 450-2, . . . .

The service providing system 101 also includes storages such as an application information storage 470 and a storage server 460. The storage server 460 is implemented by, for example, one or more computers 200. The storage server 460 may instead be provided outside of the service providing system 101. Also, the storage server 460 may be, for example, a virtual server or a part of a storage included in the service providing system 101.

The application information storage 470 may be implemented by, for example, the HD 204 and the HDD controller 205 illustrated in FIG. 2. Alternatively, the application information storage 470 may be implemented by one or more computers 200.

The service processor 410 performs processes related to services provided by the service providing system 101. The service processor 410 includes, for example, a logic processor 411, an application manager 412, and a linked service controller 413.

The logic processor 411 obtains application workflow information included in application information being managed by the application manager 412 in response to a request from the web service unit 420 to execute an application. Based on the application workflow information obtained from the application manager 412, the logic processor 411 executes a series of processes (workflow) that implement a service provided by the application. Details of the logic processor 411 are described later.

The application manager 412 manages application information stored in the application information storage 470. The application information includes, for example, application workflow information, application screen information, and application setting information.

The application workflow information defines multiple processes that implement a service provided by an application and the order in which the processes are executed. In response to a request from the logic processor 411, the application manager 412 provides application workflow information and application setting information.

The application screen information defines, for example, information for displaying an application display screen (which is hereinafter referred to as an application screen) on the web browser 401 included in the image forming apparatus 102-1. The application screen information defines a template of an application screen in, for example, HyperText Markup Language (HTML), Extensible HyperText Markup Language (XHTML), Cascading Style Sheet (CSS), or JavaScript (registered trademark).

The application setting information defines, for example, user-entered parameters and default parameters out of parameters used to execute a workflow.

Also, in response to a request from the web service unit 420, the application manager 412 stores requested application information in the application information storage 470. As a result, the application information of an application that executes a predetermined workflow is registered in the service providing system 101.

The linked service controller (virtual server controller) 413 controls the virtual server 450 that executes a second component provided by, for example, an external vendor in response to a request from the logic processor 411. Details of the linked service controller 413 are described later. The linked service controller 413 may also be referred to as a virtual server controller.

The web service unit 420 performs processes for enabling the use of services provided by the service providing system 101 from, for example, the web browser 401 of the image forming apparatus 102-1. The web service unit 420 includes, for example, an execution receiver 421 and a registration receiver 422.

The execution receiver 421, for example, functions as an application server that provides applications (web applications) to the web browser 401 of the image forming apparatus 102-1. For example, the execution receiver 421 causes the web browser 401 accessing the web service unit 420 to display an application screen operated by the user to use an application based on the application screen information managed by the application manager 412. Also, the execution receiver 421 requests the service processor 410 to execute an application in response to a request from the web browser 401.

The registration receiver 422, for example, causes the web browser 401 of the image forming apparatus 102-1 to display a web page for registering an application or a component provided by an external vendor. The registration receiver 422 requests the service processor 410 to register an application or a component in response to a request from the web browser 401.

The document service unit 430 includes first components provided by the service providing system 101 (or the information processing system 100) among multiple components that execute processes defined in a workflow. In the example of FIG. 4, the document service unit 430 includes an OCR processor 431 that executes an optical character recognition/reader (OCR) process and a conversion processor 432 that executes a conversion process. The OCR processor 431 and the conversion processor 432 are examples of first programs (components) included in the service providing system 101. The first components may also be configured to execute various processes (for example, a compression process, a decompression process, and an email delivery process) other than the OCR process and the conversion process.

The linked service generator (virtual server generator) 440 generates virtual servers 450 that execute second components provided by, for example, external vendors in response to a request from the linked service controller 413. The linked service generator 440 also manages (for example, maintains and deletes) the generated virtual servers 450. The linked service generator 440 may also be referred to as a virtual server generator.

Preferably, the linked service controller 413 manages second components provided by external vendors by dividing the second components into multiple groups, and the linked service generator 440 generates virtual servers 450-1, 450-2, . . . corresponding to the respective groups.

The virtual server 450 is generated by the linked service generator 440 and executes a process under the control of the linked service controller 413 by using, for example, a second component provided by an external vendor.

For example, when generated by the linked service generator 440, the virtual server 450 executes a predetermined program (third program) to implement a component registration unit 451 and a component processor 452.

The component registration unit 451, for example, receives a request to register or delete a second component from the linked service controller 413.

Preferably, second components provided by external vendors are stored in the storage server 460 by the linked service controller 413. Also, the component registration unit 451 obtains the second components registered by the linked service controller 413 from the storage server 460.

For example, when the virtual server 450-1 is started, the component registration unit 451 determines whether registered second components corresponding to the virtual server 450-1 exist. When a process A 461a and a process B 461b, which are examples of second components corresponding to the virtual server 450-1, are already registered, the component registration unit 451 obtains the process A 461a and the process B 461b from the storage server 460. The process A 461a and the process B 461b are examples of second programs registered in the service providing system 101.

The component processor 452 causes the second components obtained by the component registration unit 451 to execute processes in response to requests from the linked service controller 413. For example, when receiving a request to execute a "process A" from the linked service controller 413, the component processor 452 executes the "process A" by using the process A 461a obtained by the component registration unit 451.

The storage server 460 is an example of a storage that stores second components registered by the linked service controller 413. The storage server 460 may also be a server provided outside of the service providing system 101.

In the present embodiment, registered second components are stored in the storage server 460 that is separate from the virtual server 450, and the second components are downloaded from the storage server 460 when the virtual server 450 is started (generated).

This is because, for example, if only the virtual server 450 retains the second components, it may become difficult to restore the virtual server 450 when a trouble occurs. Also, storing the second components in the storage server 460 eliminates the need to upload the second components again when, for example, changing the configuration of the virtual server 450.

The application information storage 470 stores application information managed by the application manager 412. As described above, the application information includes, for example, application workflow information, application screen information, and application setting information.

(Functional Configuration of Logic Processor)

Figure 5:
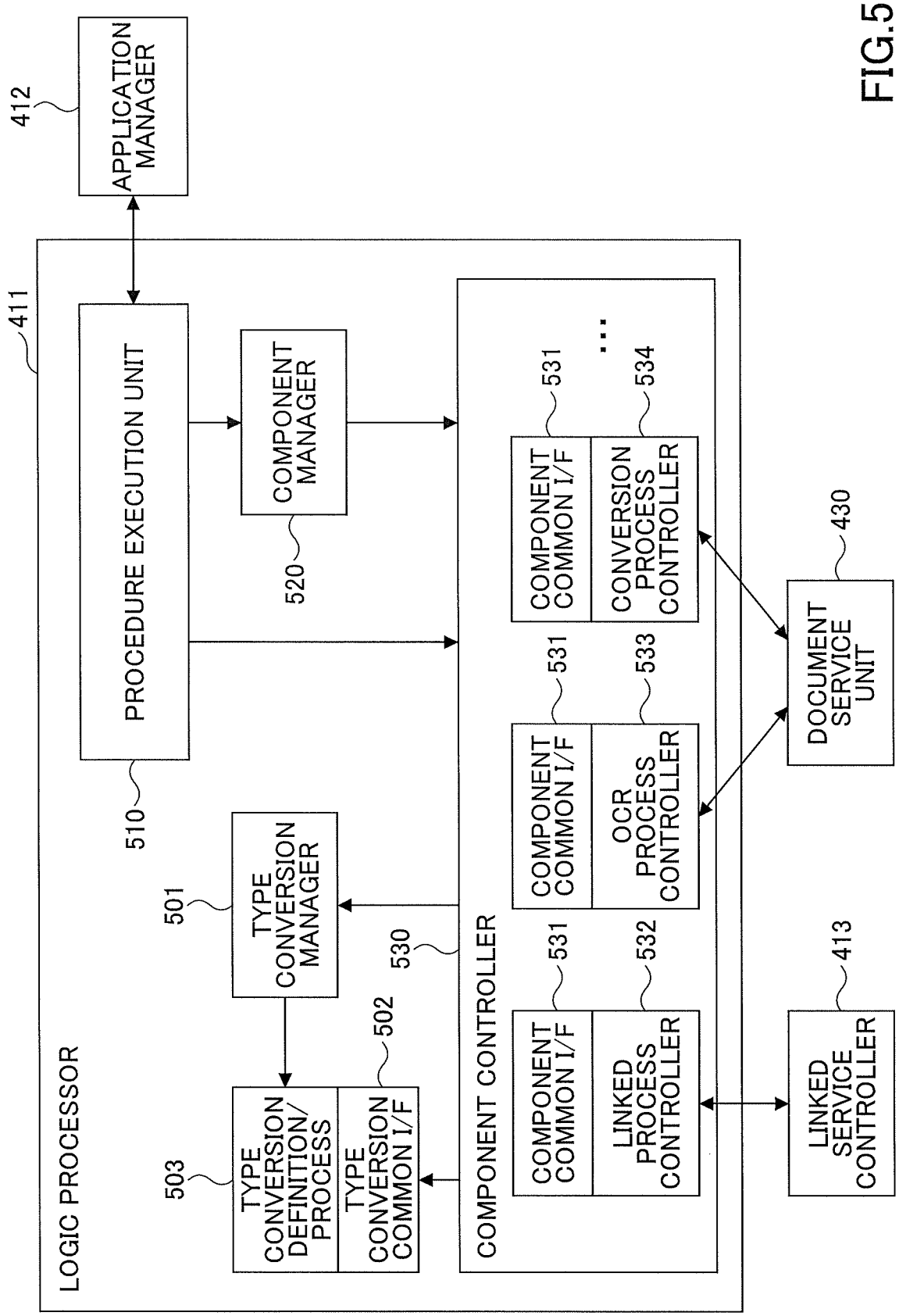
FIG. 5 is a drawing illustrating an example of a functional configuration of a logic processor according to an embodiment.

FIG. 5 is a drawing illustrating an example of a functional configuration of the logic processor 411 according to an embodiment. As illustrated in FIG. 5, the logic processor 411 includes, for example, a procedure execution unit 510, a component manager 520, a component controller 530, a type conversion manager 501, a type conversion common I/F 502, and a type conversion definition/process 503.

When receiving, for example, a request to execute an application from the web service unit 420, the procedure execution unit 510 obtains application workflow information of the application from the application manager 412. The procedure execution unit 510 executes a series of processes defined in the obtained application workflow information by using, for example, the document service unit 430 and the linked service controller 413.

Here, the series of processes defined in the application workflow information are executed by combining components for executing the respective processes. In the present embodiment, second components provided by an external vendor can be defined in the series of processes defined in the application workflow information.

The component manager (program manager) 520 manages first components included in the service providing system 101 and second components registered in the service providing system 101 among multiple components that execute a series of processes defined in application workflow information. For example, the component manager 520 stores and manages information on first components and information on second components in component information as illustrated in FIG. 6A.

FIG. 6A illustrates an example of component information managed by the logic processor 411. In the example of FIG. 6A, the component information includes "component ID", "component name", "process information", and "request target". The component ID is identification information for identifying a component. The component name is a name of the component. The process information indicates a process executed by the component.

The request target is an example of information indicating whether the document service unit 430 or the linked service controller 413 is requested to execute the component. In this example, "local host" is stored for first components included in the service providing system 101, and "linked service controller" is stored for second components registered in the service providing system 101.

However, this is just an example. As another example, the host name of a virtual server 450 that executes a second component may be stored in the request target of the second component. In this case, components whose request targets are other than "local host" may be determined as the second components.

Also, the component manager 520 generates a linked process controller 532 that controls a second component registered in the service providing system 101 in response to, for example, a request from the procedure execution unit 510. Further, the component manager 520 generates, for example, an OCR process controller 533 and a conversion process controller 534 for controlling the first components included in the document service unit 430 in response to a request from the procedure execution unit 510. Here, "generate" may also be referred to as, for example, "boot", "start", or "launch". The component manager 520 may also be referred to as a program manager.

The component controller 530 includes one or more controllers such as the linked process controller 532, the OCR process controller 533, and the conversion process controller 534 that are generated by the component manager 520. A component common I/F 531 is provided for each controller included in the component controller 530. The component common I/F 531 is an application programming interface (API) that is defined commonly for the controllers. For example, the component common I/F 531 enables the procedure execution unit 510 to request each controller to execute or generate a process using a component.

The type conversion manager 501 manages data type conversion where data to be processed is converted into a data format that can be processed by a component. Here, data types supported by the respective components are predetermined. Therefore, in response to a request from each controller, the type conversion manager 501 generates a type conversion definition/process 503 to convert data to be processed into a format that the component can process.

A type conversion common I/F 502 that can be commonly used from the type conversion manager 501 is provided for the type conversion definition/process 503. The type conversion common I/F 502 is an API commonly defined for type conversion definition/processes 503. For example, the type conversion manager 501 may request the type conversion definition/process 503 to execute or generate a type conversion process.

The type conversion process performed by the type conversion manager 501 is similar to that disclosed in, for example, Japanese Unexamined Patent Application Publication No. 2016-015400. Therefore, detailed descriptions of the type conversion process are omitted here.

With the above configuration, when, for example, the application workflow information includes an OCR process (an example of a process performed by a first component), the procedure execution unit 510 requests the OCR process controller 533 to execute the OCR process. In response, the OCR process controller 533 executes the OCR process using the OCR processor 431 of the document service unit 430.

When, for example, the application workflow information includes a process executed by a second component, the procedure execution unit 510 requests the linked process controller 532 to execute the process. In response, the linked process controller 532 requests the linked service controller 413 to execute the process.

(Functional Configuration of Linked Service Controller)

Figure 7:
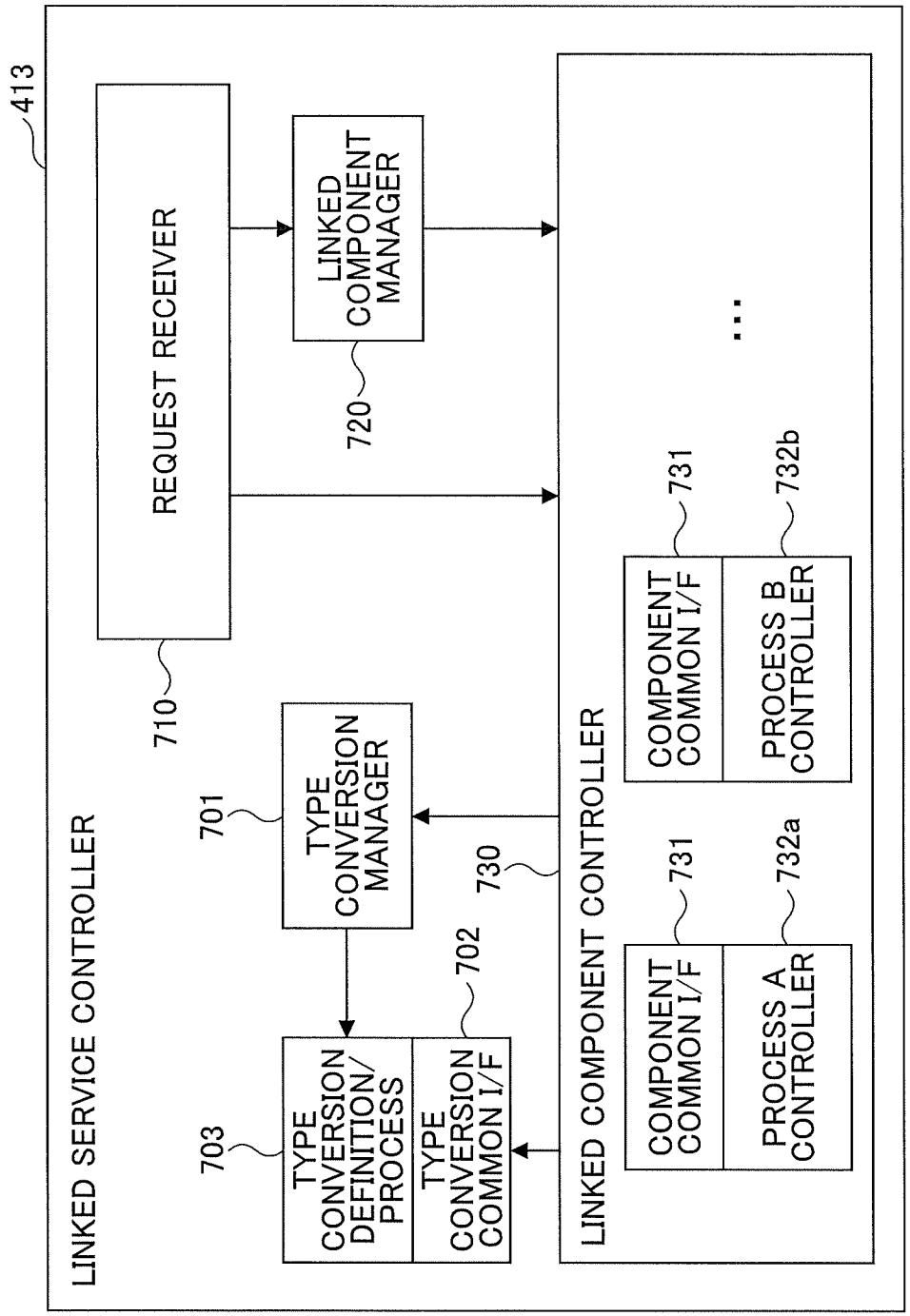
FIG. 7 is a drawing illustrating a functional configuration of a linked service controller according to an embodiment.

FIG. 7 is a drawing illustrating an example of a functional configuration of the linked service controller 413 according to an embodiment. As illustrated in FIG. 7, the linked service controller 413 includes, for example, a request receiver 710, a linked component manager 720, a linked component controller 730, a type conversion manager 701, a type conversion common I/F 702, and a type conversion definition/process 703. The linked service controller 413 has a configuration similar to the configuration of the logic processor 411 described with reference to FIG. 5. Therefore, detailed descriptions of the configuration similar to the configuration of the logic processor 411 are omitted here.

The request receiver 710 receives request information requesting execution of a second component from the logic processor 411. When receiving, for example, a request to execute a process of a second component from the logic processor 411, the request receiver 710 causes the corresponding virtual server 450 to execute the process.

The linked component manager (linked program manager) 720 manages second components registered in the service providing system 101 among multiple components that execute processes defined in the application workflow information. For example, the linked component manager 720 stores and manages information on second components in component information as illustrated in FIG. 6B.

FIG. 6B illustrates an example of component information managed by the linked service controller 413. In the example of FIG. 6B, the component information includes "component ID", "component name", "process information", and "host ID". The component ID is identification information for identifying a second component. The component name is the name of the second component. The process information is information indicating a process executed by the second component.

The host ID is identification information for identifying a virtual server 450 that executes the second component. For example, the linked component manager 720 also manages host information as illustrated in FIG. 6C.

FIG. 6C illustrates an example of host information managed by the linked service controller 413. In the example of FIG. 6C, the host information includes "host ID", "host", and "vendor ID". The host ID is identification information for identifying a virtual server 450. The host is destination information for accessing the virtual server 450. The vendor ID is identification information for identifying a vendor that provides second components.

Based on information illustrated in FIGS. 6B and 6C, it is possible to determine, for example, that a second component with a component name "process A" is provided by a vendor with a vendor ID "vendor1" and is executed by a virtual server 450 whose host is "server1.com".

As a preferred example, the linked service controller 413 manages second components by dividing the second components into multiple groups, and causes different virtual servers 450 assigned to the respective groups to execute the processes of the corresponding second components. In the examples of FIGS. 6B and 6C, the second components are grouped by vendors. For example, second components provided by a vendor with a vendor ID "vendor1" are executed by a virtual server 450 with a host ID "H0001".

As another example, the linked service controller 413 may be configured to cause different virtual servers 450 to execute the processes of the respective second components.

The linked component manager 720 may further manage host sharing information as illustrated in FIG. 6D.

FIG. 6D illustrates an example of host sharing information managed by the linked service controller 413. In the example of FIG. 6D, the host sharing information includes "sharing ID", "host ID", and "sharing vendor ID". The sharing ID is identification information for identifying a case of sharing. The host ID is identification information for identifying a virtual server 450. The sharing vendor ID is identification information for identifying a vendor that shares the virtual server 450. In the example of FIG. 6D, a virtual server 450 with a host ID "H0001" is shared by a vendor with a vendor ID "vendor3". In this case, second components provided by the vendor with the vender ID "vendor3" are executed by the virtual server 450 with the host ID "H0001".

In response to a request from the request receiver 710, the linked component manager 720 generates, for example, a process A controller 732*a* and a process B controller 732*b* that control second components managed by the linked component manager 720.

The linked component controller 730 includes one or more controllers such as the process A controller 732*a* and the process B controller 732*b* generated by the linked component manager 720. A component common I/F 731 is provided for each controller included in the linked component controller 730.

The type conversion manager 701 manages conversion of data types. For example, in response to a request from each controller, the type conversion manager 701 generates a type conversion definition/process 703 and converts a data type. A type conversion common I/F 702 that can be commonly used from the type conversion manager 701 is provided for the type conversion definition/process 703. The type conversion process performed by the type conversion manager 701 is substantially the same as that performed by the type conversion manager 501 illustrated in FIG. 5.

With the above configuration, when receiving request information requesting to execute a second component from the logic processor 411, the linked service controller 413 causes the corresponding virtual server 450 to execute the second component.

Also, when receiving request information requesting to register a second component from the logic processor 411, the linked component manager 720 executes a registration process to register the second component in the service providing system. The registration process for registering the second component is described later.

<Processes>

Next, processes in an information processing method of the present embodiment are described.

First Embodiment (Registration Process 1)

Figure 8:
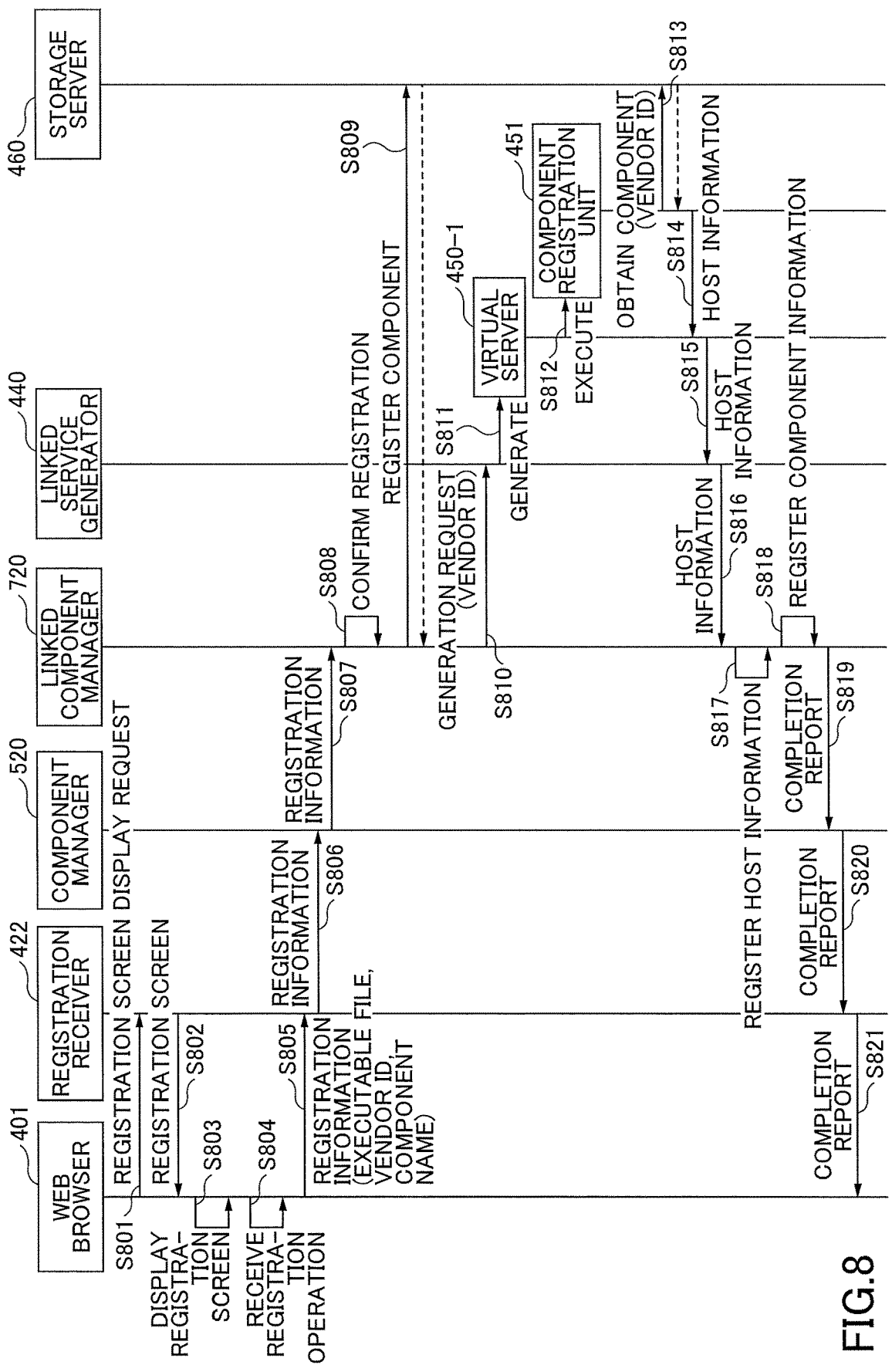
FIG. 8 is a sequence chart illustrating an example of a registration process according to a first embodiment.

FIG. 8 is a sequence chart illustrating an example of a registration process according to a first embodiment. In the registration process exemplified in FIG. 8, a second component(s) provided by an external vendor is registered in the service providing system 101 by using the web browser 401. The web browser 401 used for the registration process of the second component is not limited to the web browser included in the image forming apparatus 102-1, and may be, for example, a web browser included in an electronic apparatus or an information terminal other than the image forming apparatus 102-1.

At step S801, in response to an operation performed by, for example, an administrator to display a registration screen, the web browser 401 transmits a request to display a registration screen for registering a second component(s) to the registration receiver 422 of the service providing system 101.

At step S802, in response to the request from the web browser 401, the registration receiver 422 transmits a registration screen for registering a second component(s) to the requesting web browser 401.

At step S803, the web browser 401 displays, for example, a registration screen 910 as illustrated in FIG. 9A.

FIG. 9A illustrates an example of the registration screen 910 that the registration receiver 422 causes the web browser 401 to display. The registration screen 910 includes, for example, an input field 911 for entering a component name of a second component to be registered, an input field 912 for entering the vendor ID of a vendor providing the second component, and a "select" button 913 for selecting an executable file.

For example, on the registration screen 910, the administrator enters a component name and a vendor ID and selects the "select" button 913 to select a second component (executable file) to be registered. Also, the administrator can perform a registration operation by selecting a "register" button 914 on the registration screen 910.

At step S804, the web browser 401 receives the registration operation on the registration screen 910. At step S805, the web browser 401 transmits registration information input on the registration screen 910 to the registration receiver 422 of the service providing system 101.

At step S806, the registration receiver 422 of the service providing system 101 reports the registration information received from the web browser 401 to the component manager 520 of the logic processor 411.

At step S807, the component manager 520 of the logic processor 411 reports the received registration information to the linked component manager 720 of the linked service controller 413.

At step S808, the linked component manager 720 determines whether a second component corresponding to the received registration information is registered in the service providing system 101.

When the second component corresponding to the received registration information is already registered in the service providing system 101, the linked component manager 720 reports to the web browser 401 that the second component is already registered.

On the other hand, when the second component corresponding to the received registration information is not registered in the service providing system 101, the service providing system 101 performs step S809 and subsequent steps.

At step S809, the linked component manager 720 registers the second component (executable file) included in the registration information in the storage server 460.

Figure 10:
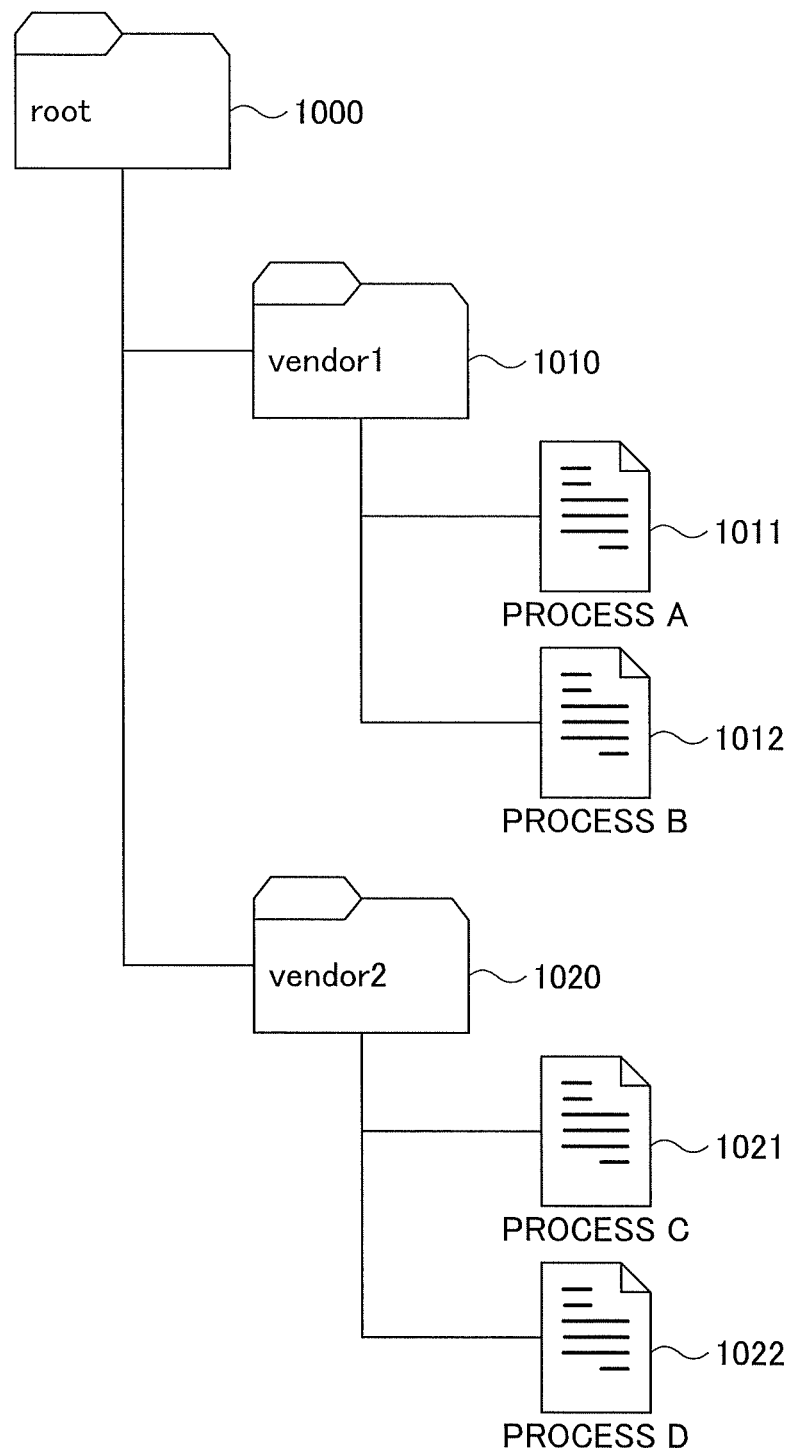
FIG. 10 is a drawing illustrating an example of an arrangement of components according to the first embodiment.

Preferably, the linked component manager 720 groups second components stored in the storage server 460 by vendors as exemplified in FIG. 10.

FIG. 10 is a drawing illustrating an example of an arrangement of components according to the first embodiment. In the example of FIG. 10, a folder 1010 for "vendor1" and a folder 1020 for "vendor2" are created under a root folder 1000 of the storage server 460. The folder 1010 for "vendor1" stores, for example, a process A 1011 and a process B 1012 that are executable files of second components provided by "vendor1". Similarly, the folder 1020 for "vendor2" stores, for example, a process C 1021 and a process D 1022 that are executable files of second components provided by "vendor2".

At step S810, the linked component manager 720 sends, to the linked service generator 440, a generation request requesting to generate a virtual server 450 for executing registered second components. The generation request includes, for example, the vendor ID of the external vendor that provides the registered second components.

At step S811, the linked service generator 440 generates the virtual server 450-1 corresponding to the vendor ID. Here, "generate" may also be referred to as, for example, "boot", "start", or "launch".

At step S812, the generated virtual server 450-1 executes a predetermined program (third program) to implement the component registration unit 451 and the component processor 452 illustrated in FIG. 4.

At step S813, the component registration unit 451 of the virtual server 450-1 obtains second components corresponding to the vendor ID from the storage server 460 and stores the obtained second components in a storage of the virtual server 450-1. For example, when the vendor ID is "vendor1", the component registration unit 451 obtains the process A 1011 and the process B 1012 corresponding to "vendor1" among the second components arranged as illustrated in FIG. 10.

At steps S814 through S816, the component registration unit 451 reports host information of the virtual server 450-1 to the linked component manager 720 of the linked service controller 413. The host information includes, for example, "host" and "vendor ID" included in the host information of FIG. 6C.

At step S817, the linked component manager 720 of the linked service controller 413 attaches a host ID to the host information reported from the component registration unit 451 and registers the host information as exemplified in FIG. 6C.

At step S818, the linked component manager 720 registers the information on the registered second components as component information as exemplified in FIG. 6B.

At steps S819 through S821, a completion report indicating that the registration of the second components has been completed is transmitted from the linked component manager 720 to the web browser 401.

Although omitted in the above descriptions, during the above process, the information on the registered second components is also registered in component information managed by the logic processor 411 as exemplified in FIG. 6A.

(Registration Process 2)

Figure 11:
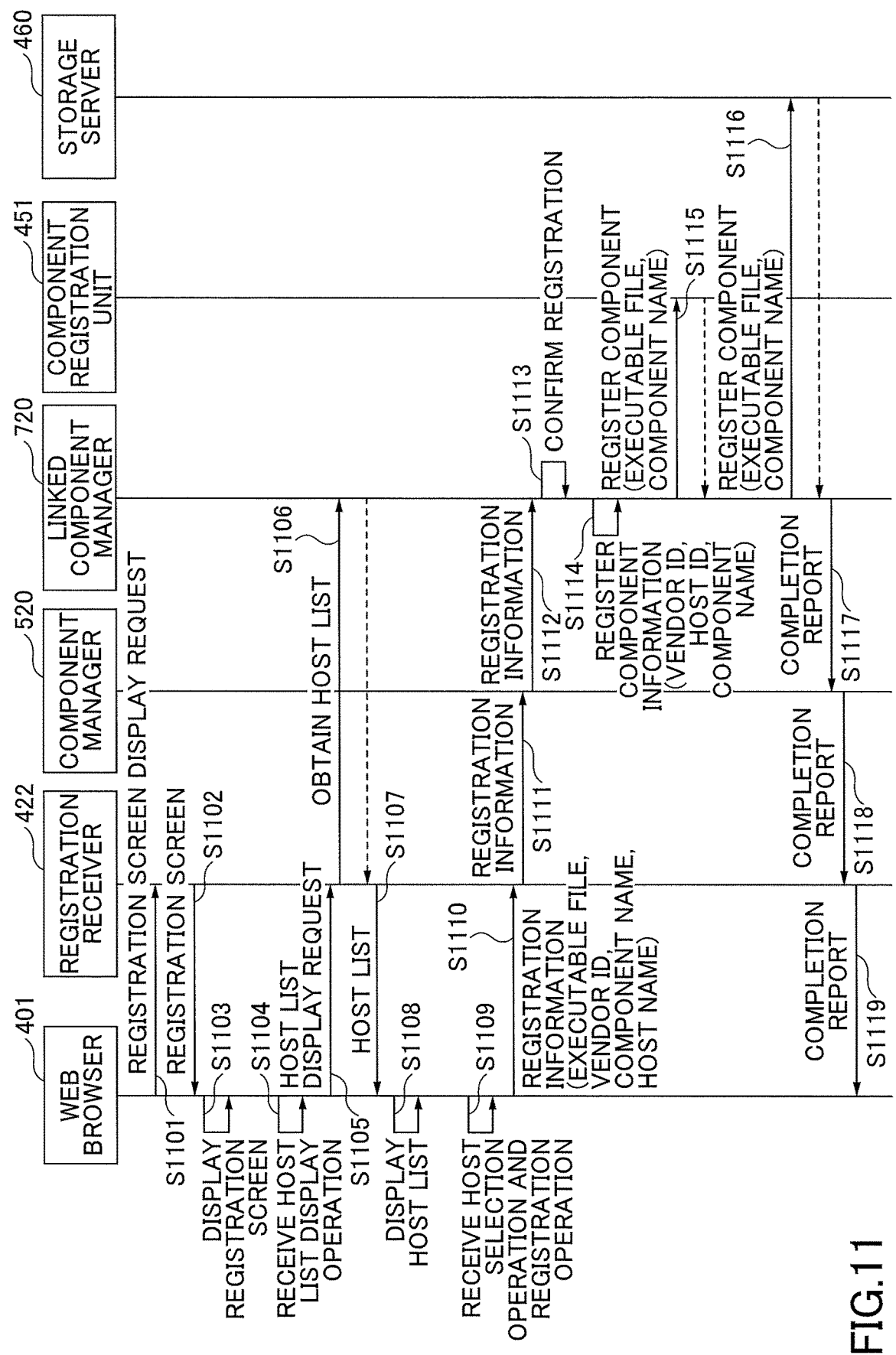
FIG. 11 is a sequence chart illustrating another example of a registration process according to the first embodiment.

FIG. 11 is a sequence chart illustrating another example of a registration process according to the first embodiment. In this example of the registration process, a second component provided by an external vendor is registered in an already registered virtual server 450. Detailed descriptions of steps that are substantially the same as the steps in the registration process of FIG. 8 are omitted here.

At steps S1101 through S1103, the web browser 401 obtains a registration screen 920 as exemplified in FIG. 9B from the registration receiver 422 of the service providing system 101, and displays the registration screen 920.

FIG. 9B illustrates an example of the registration screen 920 that the web browser 401 is caused to display by the registration receiver 422. The registration screen 920 illustrated in FIG. 9B includes an available host selection field 921 in addition to the input field 911 for entering a component name, the input field 912 for entering a vendor ID, and the "select" button 913 that are displayed on the registration screen 910 of FIG. 9A. The administrator can display a list of virtual servers 450 (which is hereafter referred to as a host list) by selecting the available host selection field 921.

At steps S1104 and S1105, when receiving a host list display operation performed by the administrator, the web browser 401 sends a host list display request to the registration receiver 422 of the service providing system 101.

At step S1106, when receiving the host list display request, the registration receiver 422 of the service providing system 101 obtains a list of hosts registered in the service providing system 101 from the linked component manager 720 of the linked service controller 413.

At steps S1107 and S1108, the registration receiver 422 of the service providing system 101 causes the registration screen 920 being displayed by the web browser 401 to display the obtained list of hosts.

When the web browser 401 receives a host selection operation and a registration operation performed by the administrator at step S1109, step S1110 and subsequent steps are executed.

At step S1110, the web browser 401 transmits registration information (which includes an executable file, a vendor ID, a component name, and a host name) input on the registration screen 920 to the registration receiver 422 of the service providing system 101.

At step S1111, the registration receiver 422 of the service providing system 101 reports the registration information received from the web browser 401 to the component manager 520 of the logic processor 411.

At step S1112, the component manager 520 of the logic processor 411 reports the received registration information to the linked component manager 720 of the linked service controller 413.

At step S1113, the linked component manager 720 determines whether a second component corresponding to the received registration information is registered in the service providing system 101.

When the second component corresponding to the received registration information is already registered in the service providing system 101, the linked component manager 720 reports to the web browser 401 that the second component is already registered.

On the other hand, when the second component corresponding to the received registration information is not registered in the service providing system 101, the service providing system 101 executes step S1114 and subsequent steps.

At step S1114, the linked component manager 720 of the linked service controller 413 registers the second component included in the registration information in component information as exemplified in FIG. 6B.

At step S1115, the linked component manager 720 registers the second component included in the registration information in the component registration unit 451 of the virtual server 450 corresponding to the host ID included in the registration information.

At step S1116, the linked component manager 720 registers the second component included in the registration information in the storage server 460.

At steps S1117 to S1119, a completion report indicating that the registration of the second component has been completed is transmitted from the linked component manager 720 to the web browser 401.

Although omitted in the above descriptions, during the above process, the information on the registered second component is also registered in component information managed by the logic processor 411 as exemplified in FIG. 6A.

Through the registration process illustrated in FIG. 8 or FIG. 11, an administrator (or a user) can register a second component(s) provided by, for example, an external vendor in the service providing system 101.

(Execution Process 1)

Figure 12:
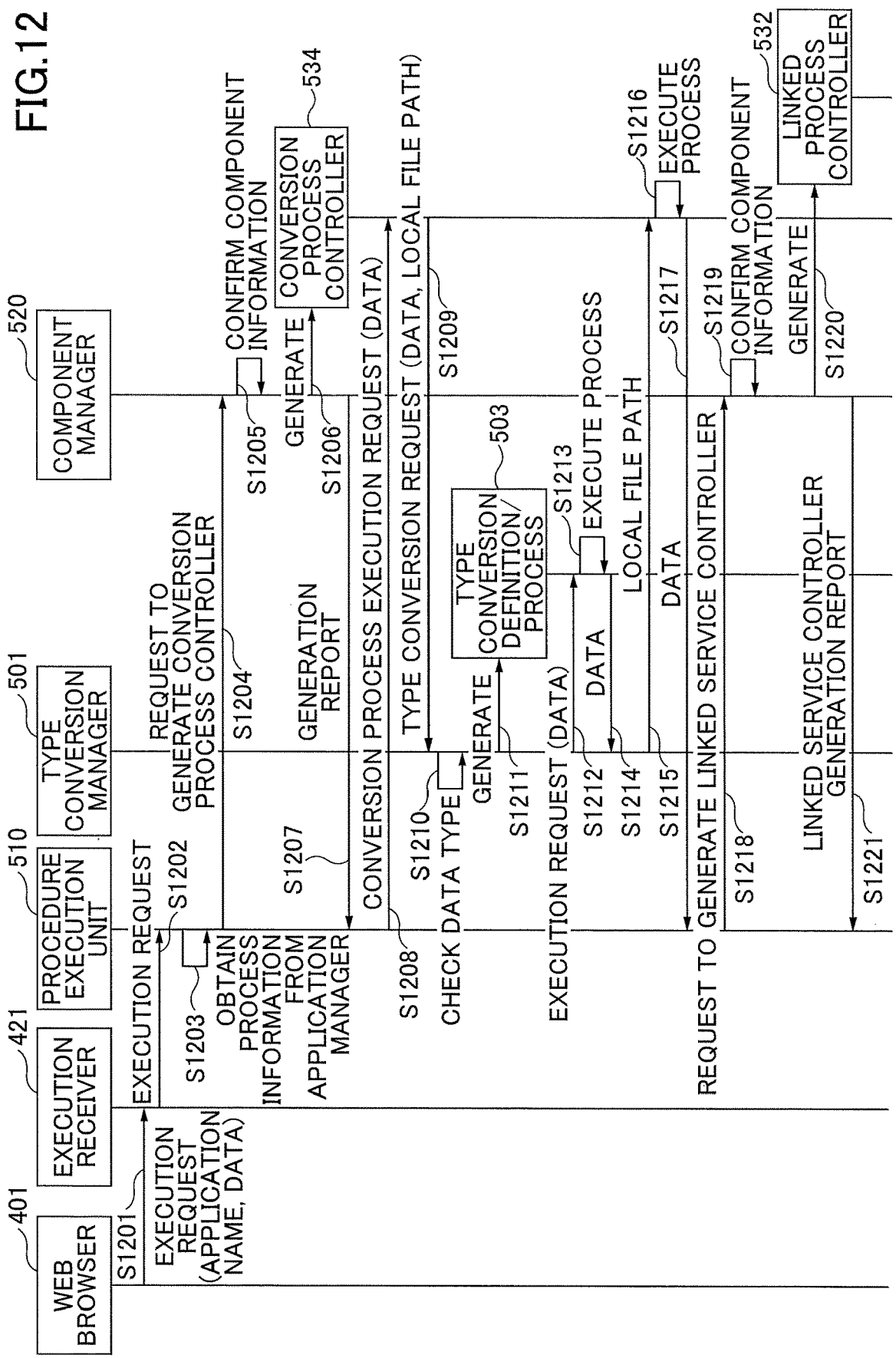
FIG. 12 is a sequence chart illustrating an example of a part of an execution process according to the first embodiment.
Figure 13:
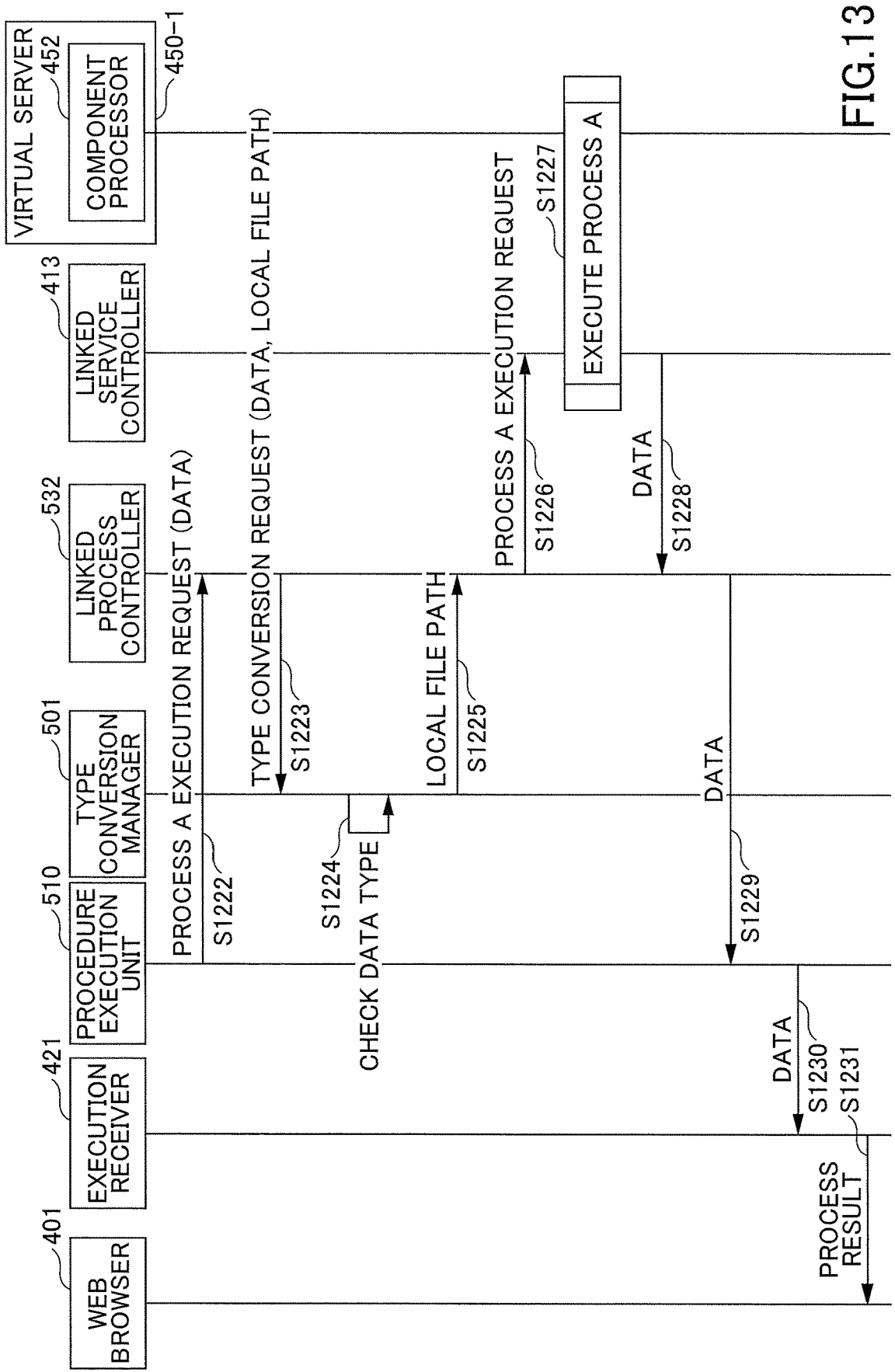
FIG. 13 is a sequence chart illustrating an example of another part of the execution process according to the first embodiment.

FIGS. 12 and 13 are sequence charts illustrating an example of an execution process according to the first embodiment. In this example of the execution process, the user executes an application provided by the service providing system 101 via the web browser 401 and thereby executes a workflow where multiple processes are defined.

At step S1201, the web browser 401 receives an application execution operation performed by the user, and transmits the application execution request to the execution receiver 421 of the service providing system 101. The application execution request includes, for example, an application name data to be processed.

At step S1202, the execution receiver 421 of the service providing system 101 reports the received application execution request to the procedure execution unit 510 of the logic processor 411.

At step S1203, the procedure execution unit 510 of the logic processor 411 obtains process information of an application corresponding to the application name included in the application execution request from the application manager 412.

For example, the procedure execution unit 510 obtains application workflow information and application setting information included in application information managed by the application manager 412. As described above, the application workflow information defines multiple processes executed by the application and the order of the processes.

In the descriptions below, it is assumed that the application workflow information includes a "conversion process" executed by the conversion processor 432, which is an example of a first component, and a "process A" executed by the process A 461a, which is an example of a second component. The application workflow information may include one or more first components and/or one or more second components, and may include three or more components. Also, the application workflow information may include multiple first components or multiple second components.

At step S1204, the procedure execution unit 510 of the logic processor 411 requests the component manager 520 to generate the conversion process controller 534 for controlling the conversion processor 432 that executes the "conversion process". Here, "generate" may also be referred to as, for example, "boot", "start", or "launch". This also applies to the descriptions below.

At step S1205, the component manager 520 refers to component information as exemplified in FIG. 6A and determines whether the component executing the "conversion process" is a first component or a second component. In this example, the component manager 520 determines that the component executing the "conversion process" is a first component executed by the document service unit 430.

At steps S1206 and S1207, the component manager 520 generates the conversion process controller 534 (see FIG. 5) that controls the execution of the "conversion process" and transmits, to the procedure execution unit 510, a generation report indicating that the conversion process controller 534 has been generated.

At step S1208, the procedure execution unit 510 of the logic processor 411 sends an execution request for the "conversion process" to the generated conversion process controller 534.

At step S1209, the conversion process controller 534 requests the type conversion manager 501 of the logic processor 411 to execute a type conversion process (data type conversion request). When data type conversion is apparently not necessary, the conversion process controller 534 may omit step S1209 and execute step S1216. The type conversion process (steps S1210 through S1215) performed by the type conversion manager 501 is similar to the related-art technology disclosed in, for example, Japanese Unexamined Patent Application Publication No. 2016-015400. Therefore, only the outline of the type conversion process is described here.

At step S1210, when receiving the data type conversion request, the type conversion manager 501 determines whether data type conversion is necessary. If the data type conversion is necessary, the type conversion manager 501 generate a type conversion definition/process 503 at step S1211. When data type conversion is not necessary, for example, the type conversion manager 501 omits steps S1211 through S1214 and executes step S1215.

At step S1212, the type conversion manager 501 requests the generated type conversion definition/process 503 to perform data type conversion.

At steps S1213 and S1214, the type conversion definition/process 503 executes the type conversion process on data and reports, to the type conversion manager 501, the type-converted data converted into a format on which "conversion process" can be performed.

At step S1215, for example, the type conversion manager 501 reports a local file path for obtaining the converted data (or the converted data itself) to the conversion process controller 534.

At step S1216, the conversion process controller 534 obtains the converted data and executes the "conversion process" using the conversion processor 432 of the document service unit 430.

At step S1217, the conversion process controller 534 reports, to the procedure execution unit 510, the data on which the "conversion process" has been performed.

At step S1218, when the "conversion process" is completed, the procedure execution unit 510 of the logic processor 411 requests the component manager 520 to generate the linked process controller 532 for controlling the virtual server 450 that executes the "process A".

At step S1219, the component manager 520 refers to the component information as exemplified in FIG. 6A, and determines whether the component executing the "process A" is a first component or a second component. In this example, the component manager 520 determines that the component that executes the "process A" is a second component whose execution is controlled by the linked service controller 413.

At steps S1220 and S1221, the component manager 520 generates the linked process controller 532 (see FIG. 5) and transmits, to the procedure execution unit 510, a generation report indicating that the linked process controller 532 has been generated.

At step S1222 in FIG. 13, the procedure execution unit 510 of the logic processor 411 sends an execution request for the "process A" to the generated linked process controller 532.

At step S1223, the linked process controller 532 of the logic processor 411 requests the type conversion manager 501 to execute a type conversion process (data type conversion request).

At step S1224, when receiving the data type conversion request, the type conversion manager 501 determines whether data type conversion is necessary. Here, when the component that executes the process is a second component, the type conversion manager 501 may determine that data type conversion is not necessary. In this case, the data type conversion process for the second component is performed, for example, by the type conversion manager 701 of the linked service controller 413 illustrated in FIG. 7.

At step S1225, the type conversion manager 501, for example, reports a local file path for obtaining data (or data itself) to the linked process controller 532.

At step S1226, the linked process controller 532 of the logic processor 411 requests the linked service controller 413 to execute the "process A".

At step S1227, the linked service controller 413 refers to component information as exemplified in FIG. 6B to determine a virtual server for executing the process A 461a, and causes a virtual server with a host ID "H0001" (for example, the virtual server 450-1) to execute the "process A". Details of a process (component process) where the linked service controller 413 causes the virtual server 450 to execute the process of the second component are described later.

At steps S1228 and S1229, the data on which the "process A" has been performed is reported from the linked service controller 413 to the procedure execution unit 510 of the logic processor 411.

At step S1230, the procedure execution unit 510 of the logic processor 411 reports, to the execution receiver 421, the data on which the series of processes defined in the application workflow information have been performed.

At step S1231, the execution receiver 421 of the service providing system 101, for example, causes the web browser 401 to display a process result including the data on which the series of processes defined in the application workflow information have been performed.

The process of steps S1228 through S1231 is just an example. For example, when the "process A" is a process such as an email transmission process that does not require reporting of processed data, only a process result including no data may be reported to the web browser 401.

(Execution Process 2)

Figure 14:
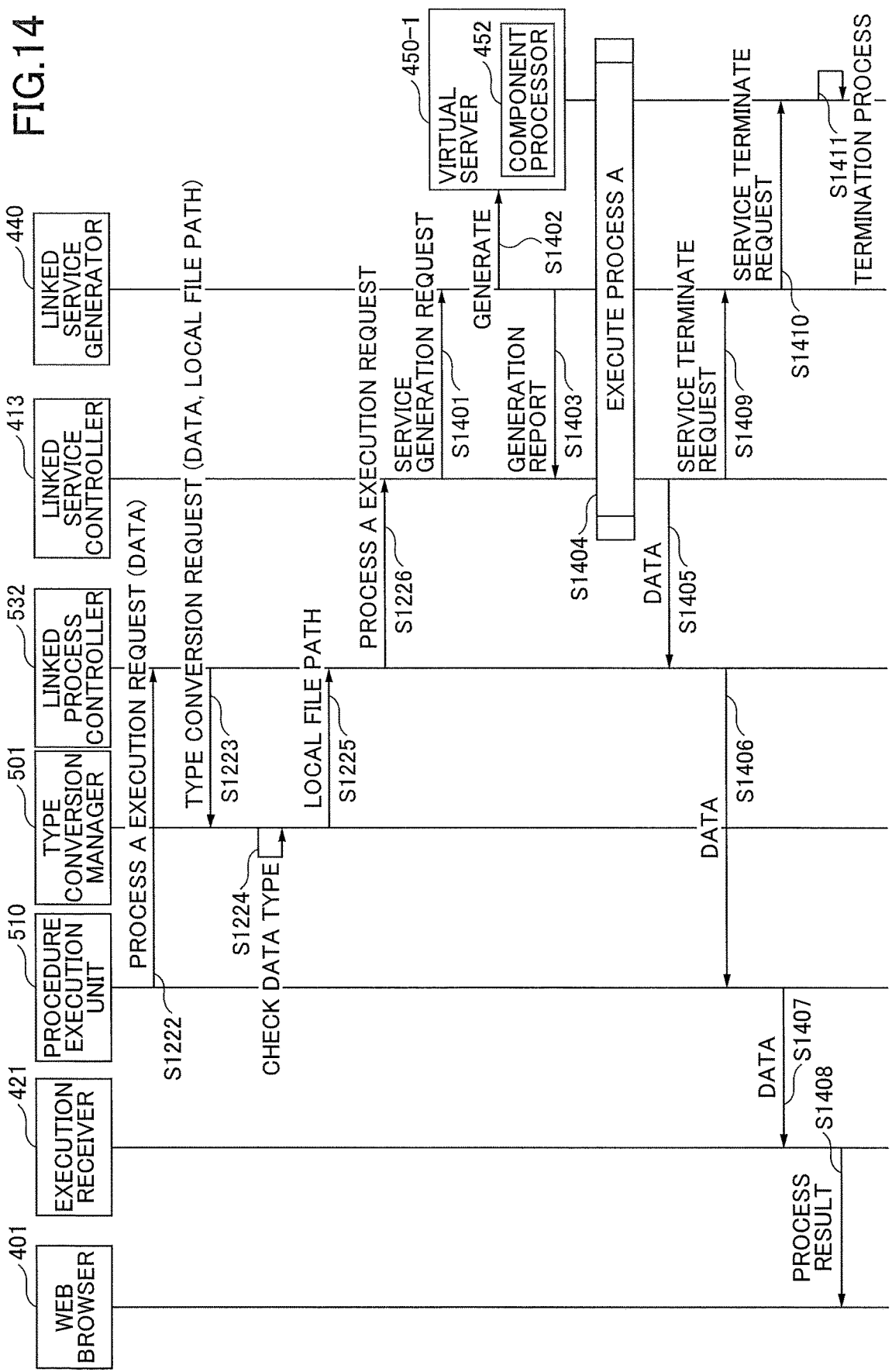
FIG. 14 is a sequence chart illustrating another example of an execution process according to the first embodiment.

FIG. 14 is a sequence chart illustrating another example of an execution process according to the first embodiment. In this example of an execution process, the service providing system 101 generates the virtual server 450 when executing a process related to a second component.

Here, it is assumed that steps S1201 through S1221 in FIG. 12 have been executed at the start of the process illustrated in FIG. 14. Steps S1222 through S1226 in FIG. 14 are substantially the same as steps S1222 through S1226 in FIG. 13, and therefore their descriptions are omitted here.

At step S1401, when receiving an execution request for the "process A", the linked service controller 413 transmits, to the linked service generator 440, a service generation request requesting to generate the virtual server 450-1 for executing the "process A". For example, the linked service controller 413 identifies a vendor ID corresponding to the "process A" based on the component information and the host information as illustrated in FIGS. 6B and 6C, and transmits a service generation request including the identified vendor ID to the linked service generator 440.

At step S1402, the linked service generator 440 generates a virtual server 450 (for example, the virtual server 450-1) corresponding to the vendor ID. As described above, the generated virtual server 450-1 implements the component registration unit 451 and the component processor 452 illustrated in FIG. 4 by executing a predetermined program. The "generation" of the virtual server 450 may also be referred to as booting, starting, launching, rebooting, or restarting. Also, instead of newly "generating" a virtual server 450, one of virtual servers generated in advance may be assigned to the "process A".

At step S1403, the linked service generator 440 reports, to the linked service controller 413, a generation report indicating that the virtual server 450-1 has been generated.

At step S1404, the linked service controller 413 causes the virtual server 450-1 for executing the process A 461a to execute the "process A". Details of a component process where the linked service controller 413 causes the virtual server 450 to execute the process of the second component are described later.

At steps S1405 and S1406, data on which the "process A" has been performed is reported from the linked service controller 413 to the procedure execution unit 510 of the logic processor 411.

At step S1407, the procedure execution unit 510 of the logic processor 411 reports, to the execution receiver 421, the data on which the series of processes defined in the application workflow information have been performed.

At step S1408, the execution receiver 421 of the service providing system 101, for example, causes the web browser 401 to display a process result including the data on which the series of processes defined in the application workflow information have been performed.

The process of steps S1405 through S1408 is just an example. For example, when the "process A" is a process such as an email transmission process that does not require reporting of processed data, only a process result including no data may be reported to the web browser 401.

At step S1409, the linked service controller 413 sends, to the linked service generator 440, a service terminate request that requests the linked service generator 440 to delete the virtual server 450-1 for executing the "process A".

At step S1410, the linked service generator 440 requests the virtual server 450-1 to terminate its service.

At step S1411, the virtual server 450-1 performs a termination process (for example, shutdown, halt, or suspension).

In the above process, the service providing system 101 starts the virtual server 450 when executing the second component. This makes it possible to efficiently use server resources.

(Component Process)

Figure 15:
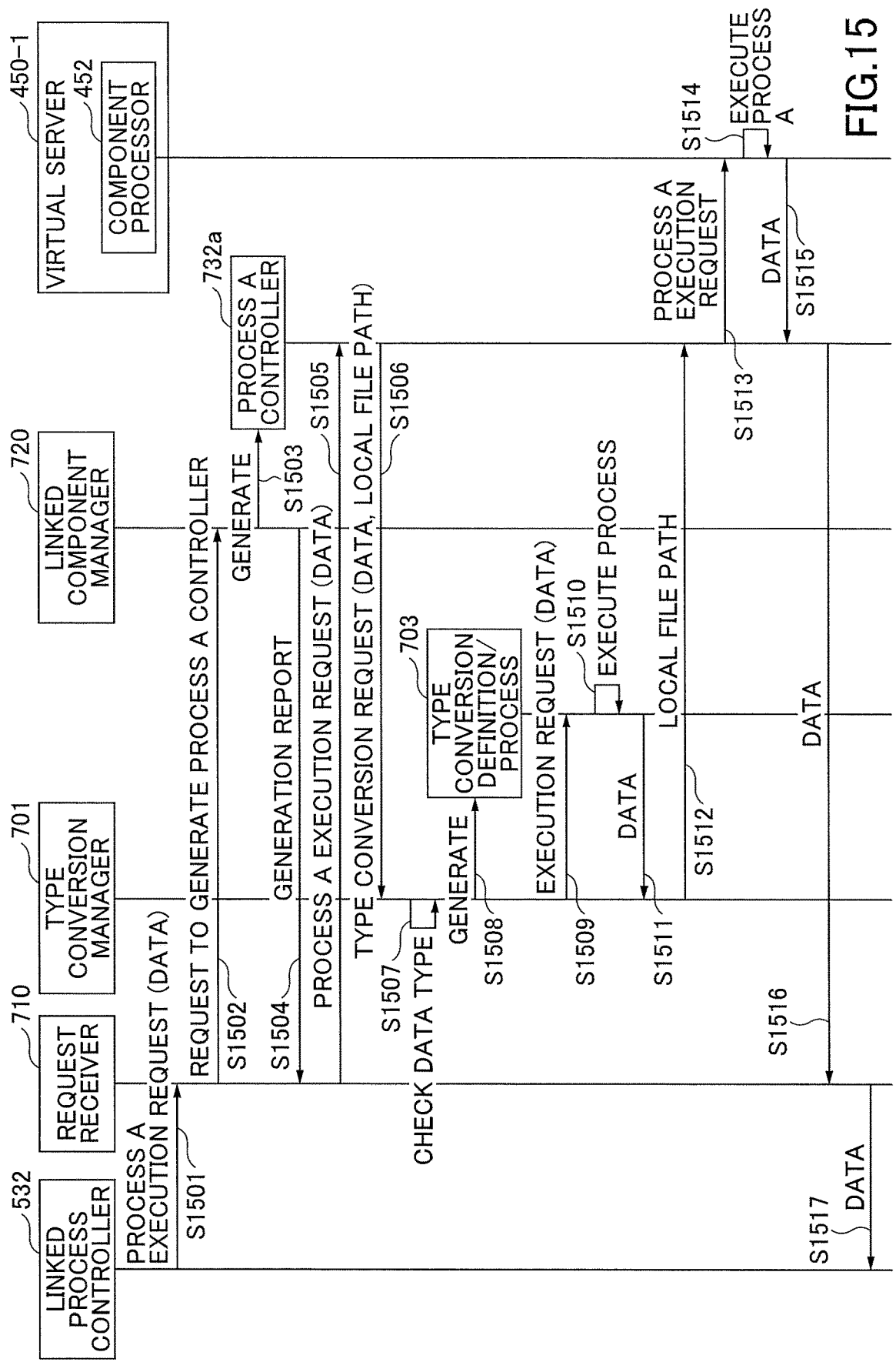
FIG. 15 is a sequence chart illustrating an example of a component process according to the first embodiment.

FIG. 15 is a sequence chart illustrating an example of a component process according to the first embodiment. In this exemplary process (component process), the linked service controller 413 causes the virtual server 450 to execute a process of a second component.

This process corresponds to, for example, step S1227 in FIG. 13 or step S1404 in FIG. 14. For example, when the linked process controller 532 sends an execution request for the "process A" to the linked service controller 413 at step S1226 in FIG. 13, step S1501 and subsequent steps in FIG. 15 are executed.

At step S1501, the request receiver 710 of the linked service controller 413 receives the execution request for the "process A" from the linked process controller 532. Here, it is assumed that the execution request for the "process A" includes data to be processed.

At step S1502, the request receiver 710 of the linked service controller 413 requests the linked component manager 720 to generate the process A controller 732a for controlling the execution of the "process A".

At steps S1503 and S1504, the linked component manager 720 generates the process A controller 732a (see FIG. 7), and transmits a generation report indicating that the process A controller 732a has been generated to the request receiver 710.

At step S1505, the request receiver 710 of the linked service controller 413 sends the execution request for the "process A" to the generated process A controller 732a.

At step S1506, the process A controller 732a requests the type conversion manager 701 of the linked service controller 413 to execute a type conversion process (data type conversion request). When data type conversion is apparently not necessary, the process A controller 732a may omit step S1506 and execute step S1513. The type conversion process (steps S1507 through S1512) performed by the type conversion manager 701 is similar to the related-art technology disclosed in, for example, Japanese Unexamined Patent Application Publication No. 2016-015400. Therefore, only the outline of the type conversion process is described here.

At step S1507, when receiving the data type conversion request, the type conversion manager 701 determines whether data type conversion is necessary. If the data type conversion is necessary, the type conversion manager 701 generate a type conversion definition/process 703 at step S1508. When the data type conversion is not necessary, the type conversion manager 701 omits steps S1508 through S1511 and executes step S1512.

At step S1509, the type conversion manager 701 requests the generated type conversion definition/process 703 to perform the type conversion of data.

At steps S1510 and S1511, the type conversion definition/process 703 executes the type conversion process on the data and reports, to the type conversion manager 701, the type-converted data converted into a format on which the "process A" can be performed.

At step S1512, for example, the type conversion manager 701 reports, to the process A controller 732a, a local file path for obtaining the converted data (or the converted data itself).

At step S1513, the process A controller 732a obtains the converted data and sends the execution request for the "process A" to the virtual server 450-1 for executing the "process A". The execution request includes, for example, the obtained data. The process A controller 732a can identify the virtual server 450-1 (for example, a host "server1.com") for executing the "process A" by referring to, for example, component information and host information as illustrated in FIGS. 6B and 6C.

At step S1514, the component processor 452 of the virtual server 450-1 executes the "process A" by using, for example, the second component obtained at step S813 in FIG. 8.

At steps S1515 through S1517, the data on which the "process A" has been executed is reported from the component processor 452 of the virtual server 450-1 to the linked process controller 532 of the logic processor 411.

Thus, the linked service controller 413 can cause the virtual server 450 to execute the second component in a manner similar to the execution process of the first component at steps S1204 through S1217 of FIG. 12.

(Deleting Process)

Figure 16:
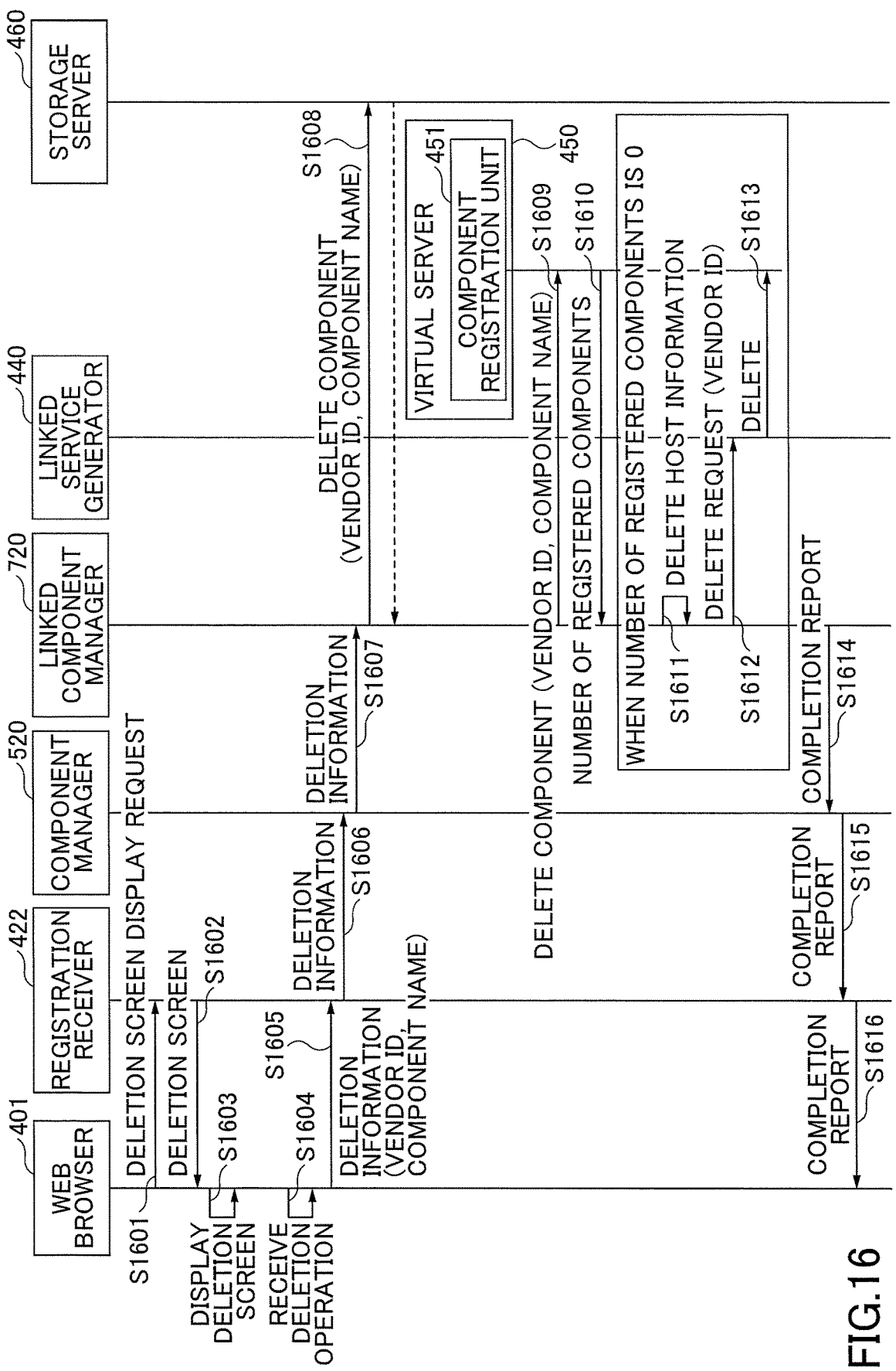
FIG. 16 is a drawing illustrating an example of a deleting process according to the first embodiment.

FIG. 16 is a sequence chart illustrating an example of a deleting process according to the first embodiment. In this example of a deleting process, a second component registered in the service providing system 101 is deleted. The web browser 401 used for the deleting process of the second component is not limited to the web browser included in the image forming apparatus 102-1. For example, a web browser included in an electronic apparatus or an information terminal other than the image forming apparatus 102 may also be used for this purpose.

At step S1601, in response to, for example, an operation performed by the administrator to display a deletion screen, the web browser 401 transmits a display request requesting to display the deletion screen for deleting a second component to the registration receiver 422 of the service providing system 101.

At steps S1602 and S1603, in response to the request from the web browser 401, the registration receiver 422 transmits a deletion screen for deleting a second component to the requesting web browser 401, and thereby causes the web browser 401 to display the deletion screen.

At steps S1604 and S1605, when receiving a deletion operation performed by the administrator, the web browser 401 transmits received deletion information to the registration receiver 422 of the service providing system 101. The deletion information includes, for example, a component name and a vendor ID of a second component to be deleted.

At step S1606, the registration receiver 422 of the service providing system 101 reports the deletion information received from the web browser 401 to the component manager 520 of the logic processor 411.

At step S1607, the component manager 520 of the logic processor 411 reports the received deletion information to the linked component manager 720 of the linked service controller 413.

At step S1608, the linked component manager 720 deletes the second component corresponding to the received deletion information from the storage server 460.

At step S1609, the linked component manager 720 deletes the second component corresponding to the received deletion information from the virtual server 450 for executing the second component to be deleted.

For example, the linked component manager 720 identifies the virtual server 450 for executing the second component to be deleted by referring to the component information and the host information as illustrated in FIGS. 6B and 6C. Also, the linked component manager 720 sends a deletion request including the component name and the vendor ID of the second component to be deleted to the component registration unit 451 of the identified virtual server 450.

At step S1610, the component registration unit 451 of the virtual server 450 deletes the second component and reports, to the linked component manager 720, the number of registered second components that are registered in the virtual server 450.

Preferably, when the number of registered second components reported from the virtual server 450 is "0", the linked component manager 720 executes steps S1611 to S1613 to delete the virtual server 450 in which no second component is registered.

At step S1611, the linked component manager 720 of the linked service controller 413 deletes information on the virtual server 450 registered in the linked service controller 413.

At step S1612, the linked component manager 720 requests the linked service generator 440 to delete the virtual server 450 to be deleted.

At step S1613, the linked service generator 440 deletes the virtual server 450.

At steps S1614 through S1616, a completion report indicating that the deleting process has been completed is reported from the linked component manager 720 to the web browser 401.

With the above process, the service providing system 101 can easily delete second components and virtual servers 450 that have become unnecessary.

As described above, the first embodiment, for example, makes it possible to register a second component provided by an external vendor in the service providing system 101 and to execute a workflow including a process performed by the second component.

The service providing system 101 causes a virtual server 450 to execute a second component provided by, for example, an external vendor. This configuration makes it possible to prevent a failure occurred in the second component from affecting the service providing system 101.

Second Embodiment

In an example of a second embodiment, for stable operation of the virtual server 450 for executing the process of a second component, multiple virtual servers 450 are provided for each host.

Figure 17:
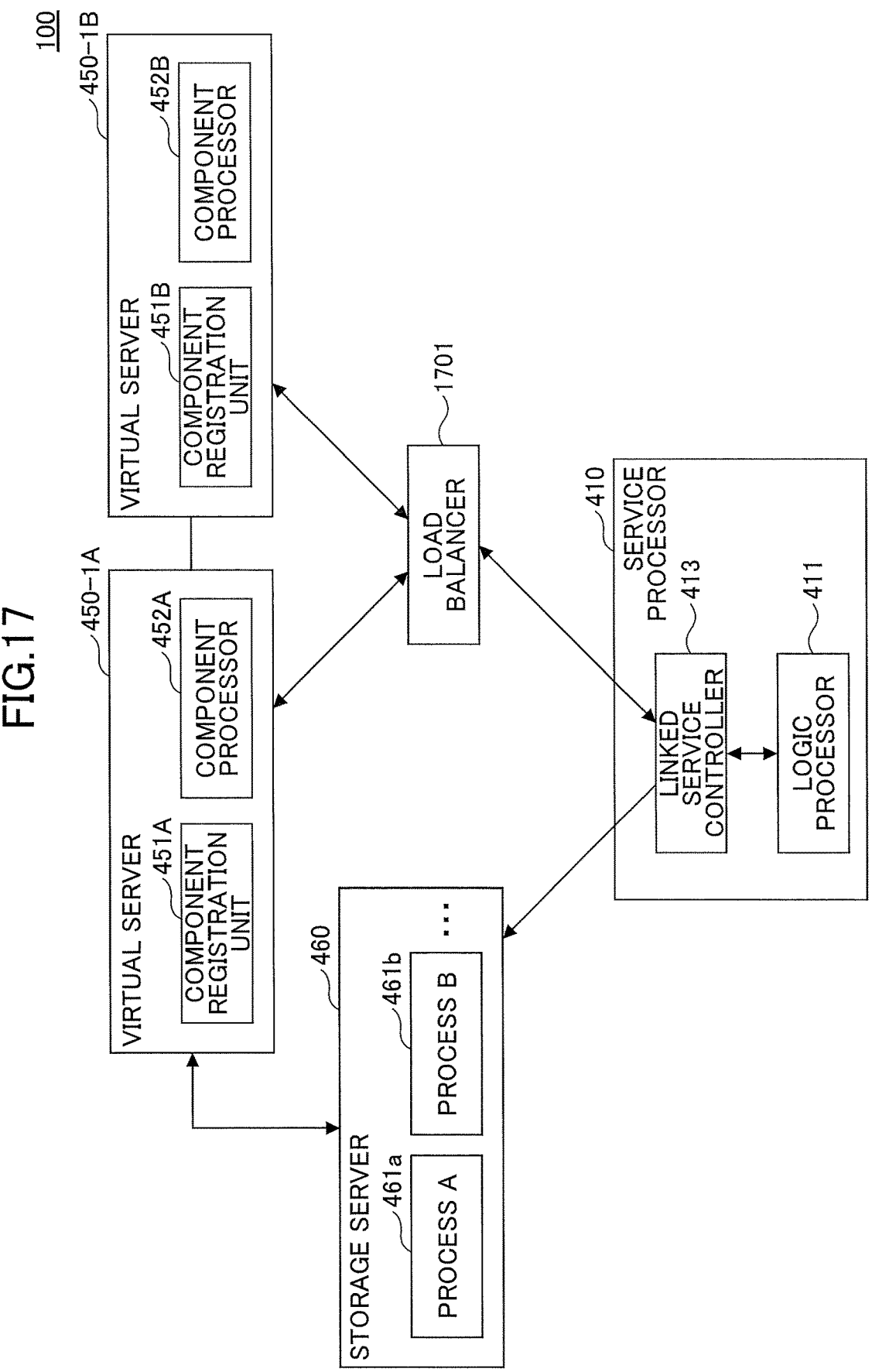
FIG. 17 is a drawing illustrating an example of a functional configuration of an information processing system according to a second embodiment.

FIG. 17 is a drawing illustrating an example of a functional configuration of an information processing system according to the second embodiment. FIG. 17 mainly illustrates differences between the functional configuration of the information processing system illustrated in FIG. 4 and the functional configuration of the information processing system according to the second embodiment.

In the information processing system of the second embodiment, a load balancer 1701 is added to the functional configuration of the information processing system illustrated in FIG. 4, and the virtual server 450-1 has a redundant configuration implemented by two virtual servers 450-1A and 450-1B.

Here, it is assumed that the virtual server 450-2 also has a redundant configuration implemented by two virtual servers 450-2A and 450-2B.

The load balancer 1701 is implemented by, for example, the computer 200 as illustrated in FIG. 2 and programs executed by the computer 200. The load balancer 1701 automatically distributes requests received from the linked service controller 413 to the virtual servers 450-1A and 450-1B.

In the information processing system 100 with the above configuration, the linked service controller 413 cannot specify a specific virtual server (for example, the virtual server 450-1A) for executing a process. Therefore, it is difficult to register second components in the virtual servers 450-1A and 450-1B with a method similar to step S1115 in FIG. 11.

Therefore, in the second embodiment, a method of registering (or updating) second components in the virtual servers 450-1A and 450-1B with a redundant configuration as illustrated in FIG. 17 is described.

<Process>

Figure 18:
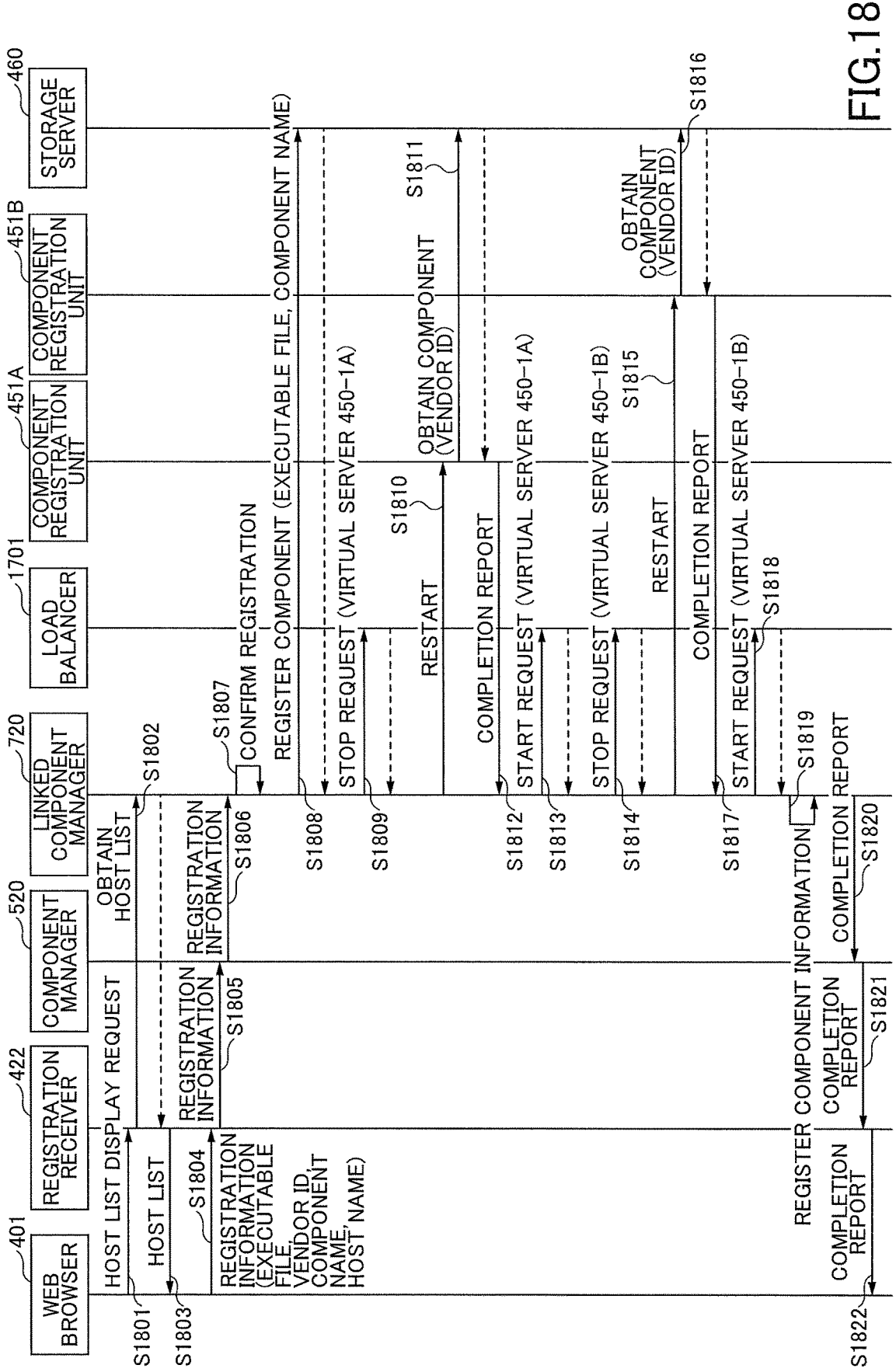
FIG. 18 is a sequence chart illustrating an example of a registration process according to the second embodiment.

FIG. 18 is a drawing illustrating an example of a registration process according to the second embodiment. Steps S1801 through S1807 are substantially the same as steps S1105 through S1113 in FIG. 11. Therefore, detailed descriptions of steps S1801 through S1807 are omitted here.

At step S1801, in response to a host list display operation performed by the administrator, the web browser 401 transmits a host list display request to the registration receiver 422 of the service providing system 101.

At step S1802, when receiving the host list display request, the registration receiver 422 of the service providing system 101 obtains a list of hosts registered in the service providing system 101 from the linked component manager 720 of the linked service controller 413.

At step S1803, the registration receiver 422 of the service providing system 101 transmits the obtained list of hosts to the web browser 401 and thereby causes the web browser 401 to display the list of hosts.

At step S1804, when receiving a host selection operation and a registration operation performed by the administrator, the web browser 401 transmits entered registration information to the registration receiver 422 of the service providing system 101.

At step S1805, the registration receiver 422 of the service providing system 101 reports the registration information received from the web browser 401 to the component manager 520 of the logic processor 411.

At step S1806, the component manager 520 of the logic processor 411 reports the received registration information to the linked component manager 720 of the linked service controller 413.

At step S1807, the linked component manager 720 determines whether a second component corresponding to the received registration information is registered in the service providing system 101.

When the second component corresponding to the received registration information is already registered in the service providing system 101, the linked component manager 720 reports to the web browser 401 that the second component is already registered.

On the other hand, when the second component corresponding to the received registration information is not registered in the service providing system 101, the service providing system 101 executes step S1808 and subsequent steps.

At step S1808, the linked component manager 720 registers the second component included in the registration information in the storage server 460.

At step S1809, the linked component manager 720 requests the load balancer 1701 to stop requests for the virtual server 450-1A.

At step S1810, the linked component manager 720 restarts the component registration unit 451A of the virtual server 450-1A or the virtual server 450-1A.

At step S1811, when the component registration unit 451A or the virtual server 450-1A restarts, the component registration unit 451A obtains a second component(s) to be executed by the virtual server 450-1A from the storage server 460.

At step S1812, the component registration unit 451A of the virtual server 450-1A sends, to the linked component manager 720 of the linked service controller 413, a completion report indicating that the restart and the acquisition of the second component have been completed.

At step S1813, the linked component manager 720 requests the load balancer 1701 to start (restart) requests for the virtual server 450-1A.

At step S1814, the linked component manager 720 requests the load balancer 1701 to stop requests for the virtual server 450-1B.

At step S1815, the linked component manager 720 restarts the component registration unit 451B of the virtual server 450-1B or the virtual server 450-1B.

At step S1816, when the component registration unit 451B or the virtual server 450-1B restarts, the component registration unit 451B obtains a second component(s) to be executed by the virtual server 450-1B from the storage server 460. Here, the second component(s) to be executed by the virtual server 450-1B is the same as the second component(s) to be executed by the virtual server 450-1A.

At step S1817, the component registration unit 451B of the virtual server 450-1B sends, to the linked component manager 720 of the linked service controller 413, a completion report indicating that the restart and the acquisition of the second component have been completed.

At step S1818, the linked component manager 720 requests the load balancer 1701 to start (restart) requests for the virtual server 450-1B.

At step S1819, the linked component manager 720 of the linked service controller 413 registers information on the registered second component(s) in the component information as illustrated in FIG. 6B.

At steps S1820 through S1822, a completion report indicating that the registration of the second component(s) has been completed is transmitted from the linked component manager 720 to the web browser 401.

Although omitted in the above descriptions, during the above process, the information on the registered second component(s) is also registered in component information as exemplified in FIG. 6A.

In the second embodiment, the virtual servers 450 in the information processing system 100 have a redundant configuration. This configuration makes it easier to stably operate the virtual servers 450.

As described above, the present embodiment makes it possible to prevent reduction in the quality of the entire service provided by an information processing system even if a problem occurs in a second component provided by an external vendor.

<Supplementary Descriptions of Embodiments>

Figure 19:
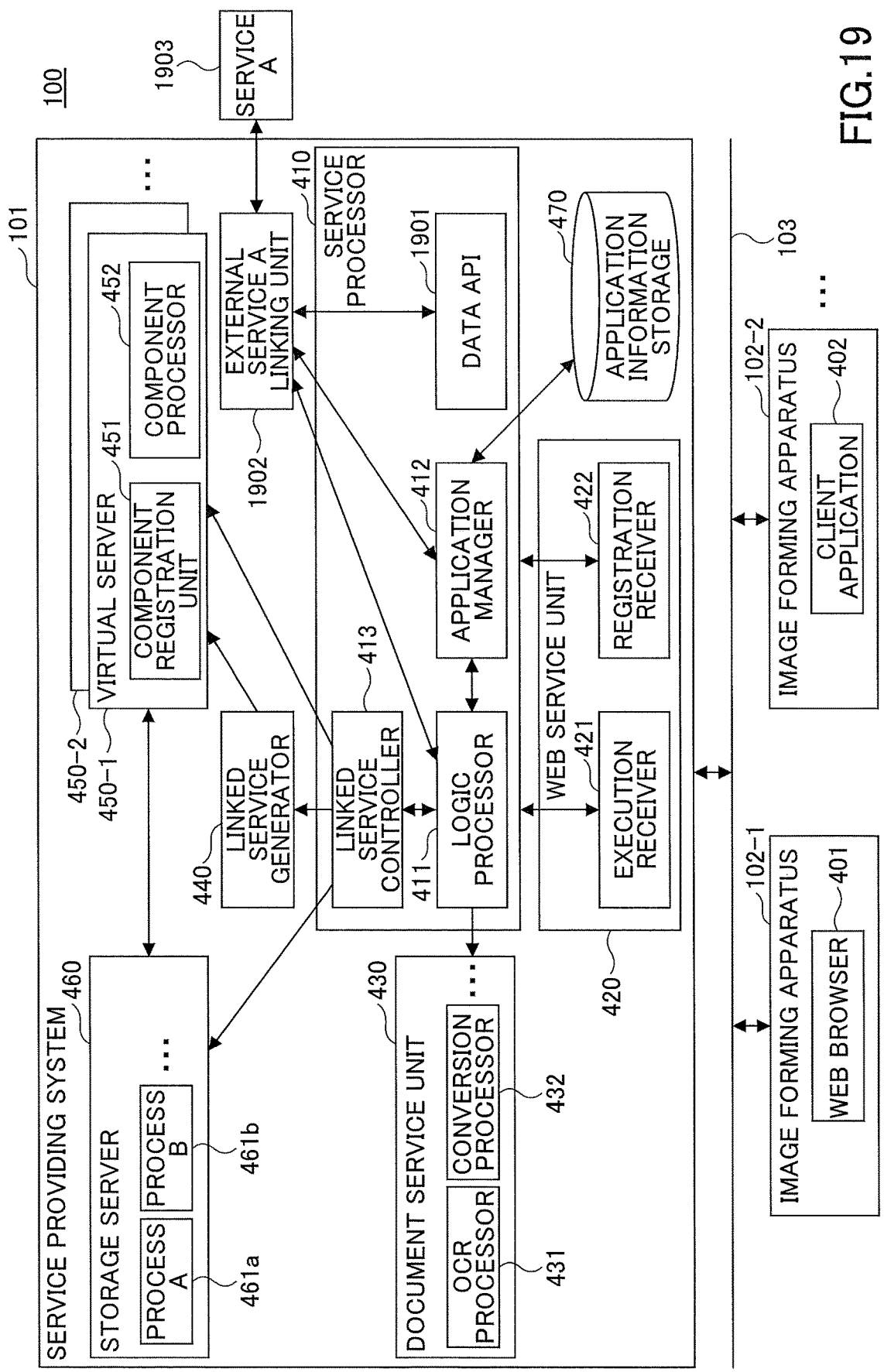
FIG. 19 is a drawing illustrating another example of an information processing system according to an embodiment.

The functional configuration of the service providing system 101 illustrated in FIG. 4 is just an example. For example, as illustrated in FIG. 19, the service providing system 101 of the above embodiment may further include an external service A linking unit 1902 and a data API 1901 for linkage with, for example, an external service A 1903.

At least a part of functional components of the service providing system 101 may be included in a terminal such as the image forming apparatus 102. For example, the service providing system 101 may cause the image forming apparatus 102 to execute at least a part (for example, a printing process, a scanning process, and a facsimile transmission process) of multiple processes defined in a workflow.

Each of the functional components described in the above embodiments may be implemented by one or more processing circuits. In the present application, the term "processing circuit" may indicate a processor implemented by an electronic circuit and programmed by software to implement various functions or a device such as an application specific integrated circuit (ASIC), a digital signal processor (DSP), a field programmable gate array (FPGA), or a circuit module designed to implement various functions described above.

Also, the apparatuses described above merely indicate one of multiple computing environments for implementing the embodiments described in the present application.

In one embodiment, the service providing system 101 may include multiple computing devices such as server clusters. The multiple computing devices may be configured to communicate with each other via a communication link such as a network or a shared memory and perform processes disclosed in the present application. Similarly, the image forming apparatus 102 may include multiple computing devices configured to communicate with each other.

Also, components of the service providing system 101 may be integrated in one server device or may be distributed to multiple devices.

An information processing system, an information processing apparatus, an information processing method, and a storage medium are described above as preferred embodiments. However, the present invention is not limited to the specifically disclosed embodiments, and variations and modifications may be made without departing from the scope of the present invention.

What is claimed is:

1. An information processing system for executing a series of processes, the information processing system comprising:
a computer configured to:
manage, among multiple programs for executing the series of processes, a first program included in the information processing system and at least a second program registered in the information processing system;
control execution of the series of processes including a process executed by the second program;
control a virtual server for executing the second program;
receive a registration request for registration of the second program in the information processing system, wherein the registration request includes the second program as an executable file; and
when the second program for which the registration request is received is not already registered in the information processing system, store, in a storage server, the second program for which the registration request is received and manage the stored second program, wherein
the computer is further configured to:
store and manage component information;
determine whether a program to be executed is the first program or the second program by referring to the component information;
update the component information upon registering the second program; and
determine, based on the component information, the virtual server and cause the determined virtual server to execute the second program,
the first program is a component pre-installed in the information processing system, and
the second program is a component registered in the information processing system by an external service provider.

2. The information processing system as claimed in claim 1, wherein
the computer is configured to
manage multiple second programs by dividing the second programs into multiple groups, and
cause different virtual servers assigned to the respective groups to execute the second programs in the corresponding groups when executing the series of processes.

3. The information processing system as claimed in claim 2, wherein the second programs are provided by multiple service providers; and the computer is configured to cause the different virtual servers assigned to the respective service providers to execute the second programs provided by the corresponding service providers.

4. The information processing system as claimed in claim 1, further comprising:

a third program configured to cause the virtual server to obtain the second program to be executed by the virtual server from the storage server, and cause the virtual server to execute the second program €n response to a request.

5. The information processing system as claimed in claim 4, wherein the virtual server is configured to execute the third program when the virtual server is started.

6. The information processing system as claimed in claim 1, wherein multiple second programs are registered in the information processing system; and the computer is configured to cause different virtual servers to execute the respective second programs.

7. The information processing system as claimed in claim 1, wherein the computer is configured to generate the virtual server for executing the second program.

8. A method performed by one or more computers constituting an information processing system to control execution of a series of processes, the method comprising:

managing, among multiple programs for executing the series of processes, a first program included in the information processing system and at least a second program registered in the information processing system;

controlling execution of the series of processes including a process executed by the second program;

controlling a virtual server for executing the second program;

receive a registration request for registration of the second program in the information processing system, wherein the registration request includes the second program as an executable file;

when the second program for Which the registration request is received is not already registered in the information processing system, store, in a storage server, the second program for which the registration request is received and manage the stored second program;

storing and managing component information;

determining whether a program to be executed is the first program or the second programs by referring to the component information;

updating the component information upon registering the second program; and determining, based on the component information, the virtual server and causing the determined virtual server to execute the second program, wherein the first program is a component pre-installed in the information processing system, and the second program is a component registered in the information processing system by an external service provider.

9. A non-transitory computer-readable storage medium storing a program for causing an information processing system to perform the method of claim 8.

* * * * *